(12) United States Patent
Walsky et al.

(10) Patent No.: US 9,032,011 B2
(45) Date of Patent: May 12, 2015

(54) MANAGEMENT OF DATA OBJECT SHARING AMONG APPLICATIONS

(75) Inventors: Joshua Walsky, Hoboken, NJ (US); Tyler Moeller, New York, NY (US)

(73) Assignee: Broadway Technology LLC, New York, NY (US)

( * ) Notice: Subject to any disclaimer, the term of this patent is extended or adjusted under 35 U.S.C. 154(b) by 0 days.

(21) Appl. No.: 13/168,892

(22) Filed: Jun. 24, 2011

(65) Prior Publication Data

US 2011/0258639 A1     Oct. 20, 2011

Related U.S. Application Data

(63) Continuation of application No. 11/218,819, filed on Sep. 2, 2005, now Pat. No. 7,546,335.

(60) Provisional application No. 60/606,547, filed on Sep. 2, 2004.

(51) Int. Cl.
    G06F 15/16    (2006.01)
    G06F 9/54     (2006.01)
    G06F 12/08    (2006.01)

(52) U.S. Cl.
    CPC ............ *G06F 9/542* (2013.01); *G06F 12/0806* (2013.01); *G06F 2209/544* (2013.01); *Y10S 707/99934* (2013.01)

(58) Field of Classification Search
    USPC ................................................. 709/219, 201
    See application file for complete search history.

(56) References Cited

U.S. PATENT DOCUMENTS

| | | |
|---|---|---|
| 5,257,369 A | 10/1993 | Skeen et al. |
| 5,287,507 A | 2/1994 | Hamilton et al. |
| 5,832,219 A | 11/1998 | Pettus |
| 6,047,284 A | 4/2000 | Owens et al. |
| 6,122,664 A | 9/2000 | Boukobza et al. |
| 6,138,168 A | 10/2000 | Kelly et al. |
| 6,275,957 B1 | 8/2001 | Novik et al. |
| 6,289,382 B1 * | 9/2001 | Bowman-Amuah .......... 709/226 |
| 6,298,455 B1 | 10/2001 | Knapman et al. |
| 6,367,034 B1 | 4/2002 | Novik et al. |
| 6,442,565 B1 | 8/2002 | Tyra et al. |
| 6,484,200 B1 * | 11/2002 | Angal et al. ................... 709/224 |
| 6,636,886 B1 * | 10/2003 | Katiyar et al. ................ 709/203 |
| 6,738,975 B1 | 5/2004 | Yee et al. |
| 6,742,181 B1 * | 5/2004 | Koike et al. ................... 719/317 |
| 6,826,557 B1 | 11/2004 | Carter et al. |
| 6,865,591 B1 | 3/2005 | Garg et al. |

(Continued)

*Primary Examiner* — Andrew Georgandellis
(74) *Attorney, Agent, or Firm* — Leason Ellis LLP

(57) ABSTRACT

Presented are a system and method for sharing data objects among applications. Included is a data protocol layer that permits a flow of data messages among the applications, where a portion of the data messages include data objects stored in a data store. A client library is coupled between the applications and the data protocol layer. A data request module associated with each client library requests data objects from the data stores that match a particular data-object set. A management server receives the request, parses the request, retrieves any matching data objects, and causes the return of the any matching data objects to the data request module. Associated with the management server is a registration module that accepts subscriptions from subscribing applications. An event notification module associated with the management server compares a data object in a data message with the subscriptions, and notifies the subscribing applications in response.

36 Claims, 8 Drawing Sheets

(56) References Cited

U.S. PATENT DOCUMENTS

| | | |
|---|---|---|
| 6,910,070 B1 | 6/2005 | Mishra et al. |
| 7,296,023 B2 | 11/2007 | Geyer et al. |
| 2003/0033437 A1* | 2/2003 | Fischer et al. ............... 709/310 |
| 2003/0140058 A1 | 7/2003 | Martin et al. |
| 2005/0165859 A1* | 7/2005 | Geyer et al. ................. 707/201 |
| 2005/0240591 A1 | 10/2005 | Marceau et al. |

* cited by examiner

MANAGEMENT OF DATA OBJECT SHARING AMONG APPLICATIONS

CLAIM OF PRIORITY

This application is a continuation application of U.S. patent application Ser. No. 11/218,819, filed Sep. 2, 2005 which claims the benefit of priority, under 35 U.S.C. §119(e), of U.S. Provisional Application No. 60/606,547, filed Sep. 2, 2004, and titled "TRADE MANAGEMENT SYSTEM," which are hereby incorporated by reference in their entireties.

FIELD OF INVENTION

The present invention relates to a distributed data and application management infrastructure, and particularly to a management infrastructure which connects disparate applications so as to share data without the applications being involved in delivering the data between applications, nor being involved in propagating changes to the data among the disparate applications.

BACKGROUND OF THE INVENTION

As computer applications and systems have become more complicated, the number of individual components that make up an application or system have increased dramatically. As the number and complexity of individual components increases, there arises a need to run these components across multiple computers for various reasons, including distributing processing power, increasing reliability (by having multiple instances of a given component running in different physical locations), and allowing access into the system by various users and external systems on multiple computers and in geographically dispersed locations.

As the number of components and computers running those components in a system increases the ability to add new components, reliably improve existing components, and effectively manage an operational system becomes increasingly harder. In many complex systems various aspects of a system may have been written by numerous programmers, with a commensurate number of differing communication paradigms between various components of the system. Adding a new component into the system that must communicate with other existing components, or simply extending the capabilities of an existing component, often means a programmer must discover all the communication paradigms and data formats in use in the existing system, code against multiple schemes in use, and rely on a generally poorly understood view of the system as background for how the new or improved component will operate in the existing system. The effects of the changes are not often well understood, and quite often their impact is not even recognized until the changes fail after being placed into a live system.

Presently, numerous techniques exist for communicating between components within a system, including the following subset of generally established methodologies: database storage, publish/subscribe messaging, and remote procedure call (or request/reply) frameworks. A high-performance, widely distributed system, will likely have some form of all three of these communication methodologies in place, often in redundant forms (multiple publish/subscribe messaging layers, for example, may coexist in a single system).

Relational databases allow for the persisted storage of large volumes of regular data. Typically, data are stored in tables, with each table made up of a well-defined row/column format. Each row in the table is a group of related data (such as a mailing address), and each column in the table is a property of the group of data (such as the street name of the mailing address). Databases typically provide complex querying capabilities, allowing a user to write a set of filtering criteria that retrieve data from the database that matches the given filter. Multiple applications may connect to a single database simultaneously; most databases provide mechanisms to ensure that two applications writing the same rows of data do not conflict with each other and see consistent results with each other. This mechanism allows a database to provide for sharing of data between applications, as one application may write a database row that another application may later query. Using a database for sharing of data generally requires each application interested in receiving data from another application to continuously query the database to see if new data has been inserted into a table. Because of this, a database is generally referred to as a "pull" based technology that requires a consumer of data to actively query the database.

Publish/subscribe messaging allows for more efficient high-frequency communication between components within a system. Generally, publish/subscribe messaging works by producers of data (publishers) generating messages that are sent out over the messaging layer. These messages often consist of property/value pairs that contain the name of a property of the data and its corresponding value. Consumers of data, or subscribers, register a subscription indicating an interest in a given set of data, often by writing criteria that indicate fields that must carry certain values. If an incoming message from a producer has the fields the subscriber is interested in, with the correct values, the subscriber will receive the message and can act on it accordingly. Typically, publish/subscribe data is not persisted over time by a messaging layer like data in a database. If an application registers an interest in a set of published data, it will only receive new messages meeting that criteria. Unlike a database, past data cannot be retrieved through a query mechanism. Publish/subscribe can send a message from a single producer to a single consumer or from a producer to a large number of consumers. Often times, a publish/subscribe messaging system is optimized such that only one message is sent on a network from a publisher to each subscriber that has registered an interest in that message. Because publish/subscribe allows a publisher to send data directly to interested subscribers, it is often referred to as a "push" technology that allows consumers to passively listen to data they are interested in. Publish/subscribe technologies are used when a producer of data has a set of updating data that a large number of consumers might be interested in, homogeneously, each time the data changes.

Remote procedure call or request/reply infrastructures provide a direct application-to-application communication mechanism like publish/subscribe, but are pull-based technologies. A consumer interested in a set of data may send a message to a producer that can provide that data, which in turn will reply with a message containing the relevant data. These technologies are often implemented when computing a set of data can only happen based on parameterized inputs known only by the consumer of the data, when the data production is a very expensive operation, when a set of data will be infrequently asked for, or when the sheer number of consumers interested in varying sets of data makes calculating all of the data continuously prohibitively expensive. Instead of continuously generating output data, the producer only must generate its output data when requested by a consumer.

In a typical, large-scale, distributed environment, all three technologies are required. A database is needed to store data that must be accessible across time, and which is able to be backed up in case of failure. Databases can be too large to completely fit within a single application at one time. A publish/subscribe mechanism is needed to broadcast rapidly changing data that many applications within the system are interested in receiving ("hearing"), in real-time, without requiring the overhead and delay of every application constantly querying an inherently slow database technology. A request/reply mechanism is needed to distribute calculations within an application across different machines or to provide shared and abstracted server resource capabilities to a variety of applications. For example, a single server may provide a price calculation service through a request/reply mechanism to user-facing graphical interface applications, to a web server, and to stand-alone processing servers.

Missing from the art is a unifying data system where data is persisted over time across a distributed computer system. The present invention can satisfy these and other needs.

SUMMARY OF THE INVENTION

In accordance with one aspect of the invention, a system for sharing data objects among applications available on a network is presented. The system includes a data protocol layer that permits a flow of data messages among applications on the network, where a portion of the data messages include data objects which are stored in a data store. A client library is coupled between the applications and the data protocol layer. A data-type definition language defines one or more data-types shareable among the applications, and a data-set definition language defines data-object sets. A data request module associated with each client library requests data objects from the data stores that match a particular data-object set. A management server receives the request, parse the request, retrieve any matching data objects, and causes the return of the any matching data objects to the data request module. Associated with the management server is a registration module that accepts subscriptions from subscribing applications. An event notification module associated with the management server receives a data message from the applications on the network, compares the data object in the data message with one or more of the subscriptions, and selectively notifies the subscribing applications in response to the comparison.

In a further aspect of the invention, the request and the subscription each have respective formats that are defined by the data-set definition language.

In accordance with another aspect of the invention, a method for sharing data objects among applications available on a network is presented.

These and other aspects, features, steps and advantages can be further appreciated from the accompanying drawing Figures and description of certain illustrative embodiments.

BRIEF DESCRIPTION OF THE DRAWING FIGURES

DETAILED DESCRIPTION OF ILLUSTRATIVE EMBODIMENTS

By way of introduction and overview, presented is a distributed data and application management infrastructure that rapidly and efficiently connects together disparate applications so that they can communicate with each other, and with external applications through various data storage and transmission mechanisms.

Figure 1:
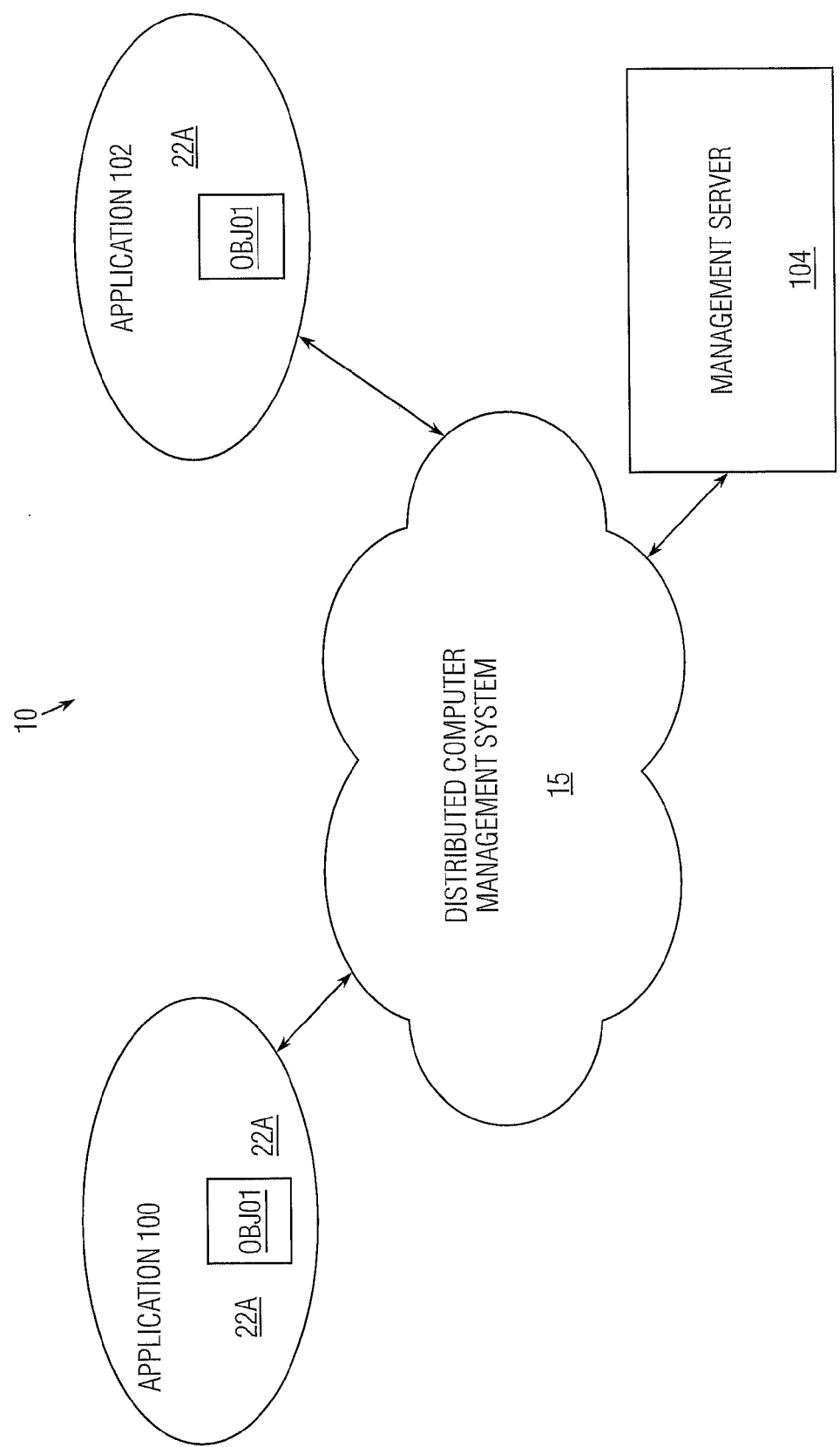
FIG. 1 illustrates a schematic configuration for a system in accordance with one embodiment of the present invention.

FIG. 1 depicts a system 10 that connects together disparate applications 100, 102. System 10 includes a distributed computer management infrastructure 15 that is in communication with each of applications 100 and 102.

A salient aspect of the management infrastructure 15 is the ability to enable distributed applications 100, 102 to share data over time with each other using a commonly understood and agreed upon data type definition. An abstraction layer is provided by which the mechanics of how data objects and their modifications are propagated among various applications and data stores is abstracted away from the applications themselves. Multiple applications within a distributed system share data without concerning themselves with, or knowing, the mechanics of delivering the data from one application to another.

Data can be shared among the applications through the use of distributed data objects. A distributed data object is a data container with typed properties defined by the data type definition that lives across both space and time. Copies of a data object may exist simultaneously within various applications and data stores (including, for example, memory caches, databases, and disk files) in a system. For example, within application 100 is an instantiation of a data object 22A having an identifier of OBJ01, which is simultaneously existing as another instantiation 22B within application 102, and having the same identifier OBJ01. All existences, including instantiations 22A, 22B, of OBJ01 are kept in synchronization with each other so as to maintain the object's consistency across the system should any copy of the object be changed. Applications gather data objects from other applications and data stores by describing objects they are interested in using a common data set description language.

The management infrastructure 15 includes mechanisms to discover and retrieve data that an application is interested in, described in the data set description language. These mechanisms include point-to-point messaging, publish/subscribe messaging, and remote procedure calls. Data may live in other applications, in various data stores, or be generated on the fly by various components within the system. The management infrastructure 15 uses the best mechanism to effectively move data objects and their updates among system components, while managing them transparently such that each end application 100, 102 is abstracted away from the specifics of how the data it requires from other applications is retrieved and how the data it provides to other applications is sent. This technique allows applications to concern themselves only with describing data objects they are interested in obtaining from the system and publishing data objects back into the system while the underlying architecture of the management infrastructure 15 determines the appropriate technology with which to propagate and persist the data objects.

The management infrastructure compiles all of the data in the system that meets with the description provided by an application. The management infrastructure 15 passes the application a unified data set meeting the description regardless of how or from where the data arrived. The system maintains consistency across data such that if any application changes shared data that another application is interested in, the infrastructure ensures that all copies of the data are kept consistent throughout the system. This unified consistency of data across the system is also managed transparent to the applications 100, 102.

The management infrastructure 15 provides application-independent approaches to configure how data can be transmitted among components of the system (e.g., in a point-to-point or broadcast mode, or via delta messages).

The overall transparency of the management infrastructure 15 stems from its common data set description language. This language provides the ability to describe sets of data based on a filter criteria that match given data object fields. Many portions of the infrastructure's operation use the same data description language to retrieve data, establish subscriptions, define data caches, search caches for matching data, establish communication channels, and configure various security mechanisms.

The infrastructure 15 also provides a mechanism for setting permissions for applications such that they can only write and read specific data, arbitrarily described, in a manner independent of how and from where the data is retrieved. The infrastructure monitors the health and statistics of the connected applications, and allows the monitored information to be read by other applications to ensure the system as a whole is operating successfully and optimally.

To achieve the functionality described, in communication with the management infrastructure 15 is a management server 104. Management server 104 can be a set of code that monitors information about the simultaneously existing data object instantiations 22A, 22B within the application 100, 102. Each application that wishes to share data registers a subscription with the management server 104 over the management infrastructure 15. As explained below, the management server 104 is able to track the data object instantiations 22A, 22B for changes. In response to the subscriptions, the management server 104 sends messages using the management infrastructure 15 to the registered applications.

Figure 2:
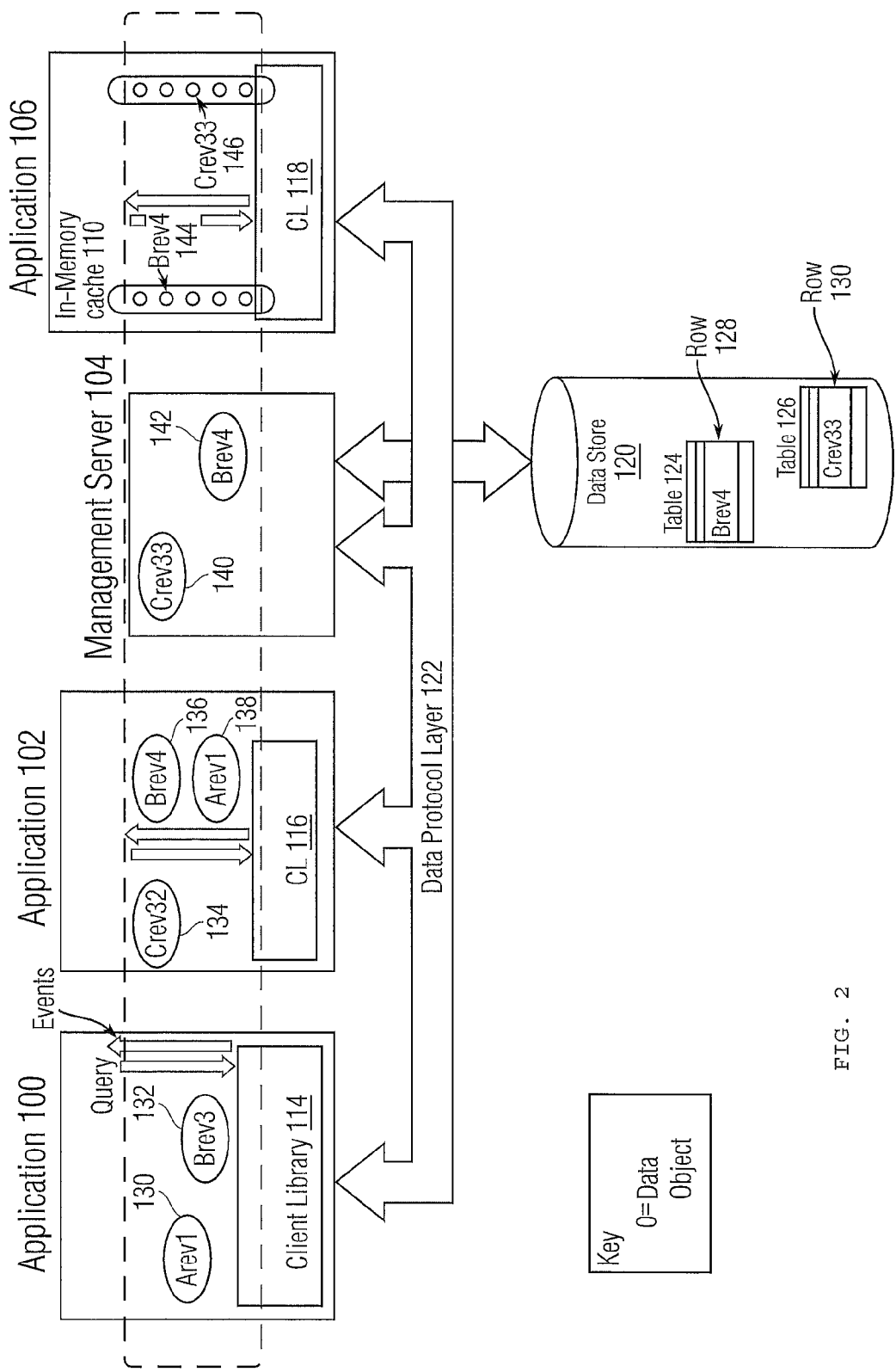
FIG. 2 illustrates a schematic configuration for a system in accordance with another embodiment of the present invention.

FIG. 2 is a schematic representation of system 10, which here connects together disparate applications 100, 102 and 106. Associated with each application is a respective client library 114, 116 and 118. The client library acts as an adaptor between the associated application and a data protocol layer 122. The applications 100, 102, 106 each can have a different native language. The client library can be written in the native language for its associated application. For example, if application 100 is written in Java, client library 114 is written in Java. The client libraries 114, 116, 118 communicate with each other on the data protocol layer 122 and facilitate communication and data accessibility between the applications 100, 102, 106.

Management server 104 is also connected to the data protocol layer 122. The client libraries 114, 116, 118 provide their associated applications with connectivity to the management server. A request for data from an application is made using a data definition language statement against a client library. The client library then forwards the request (or query) object to the management server 104. Connected to the management server is data store 120.

The management server 104 translates the data set definition query into a query to be run against the data store, retrieves matching data from the data store, and translates data from the format of data store 120 into data objects defined within the data type definition, so that the data within the data store 120 can be sent on the data protocol layer 120 back to the applications 100, 102, 106.

Conversely, an application 100 can write a data object to its client library, which forwards the object to the management server 104. Management server 104 in turn translates the data object into the format of data store 120, so that the data contained within the data object can be stored in the data store. Management server 104 also sends a message indicating that the data object was updated to the applications 100, 102, 106 that have indicated an interested in the object. Applications 100, 102, 106 do not know each other or a data store exist, but rather, just knew they had various requests and interest in particular sets of objects.

Embodiments of the present invention include multiple components. Representative embodiments of the components are described in the following subsections. Each embodiment of the invention contains various combinations of these components, and are not limited to merely the component embodiments described below. Additionally, the components are themselves not limited to the embodiments described below.

System

A used herein, the term "system" is considered to mean any number of applications running on any number of computers that are communicating with each other for the purpose of sharing data and/or services. The format of the shared data "objects" and the mechanisms of their communication are handled as described below.

Distributed Data Objects

In one embodiment, data is shared among applications through the use of distributed data objects. A distributed data object lives across both space and time. Copies of the same data object may live within various applications and data stores. Changes made to a copy of the data object in one location are propagated to other copies of the object such that all copies are kept consistent and up-to-date with all other copies, as well as allowing objects to be stored across time in various data stores. A distributed data object may be created within an application and transmitted to other applications that are interested in data objects meeting a certain criteria met by the newly created object. Any application holding a reference to this object might modify the object, causing the changes to be propagated to other applications interested in the object. Similarly, the object may be stored in a data store 120 and the data store updated with changes made to the distributed object such that the object can live beyond and be retrieved after the lifetime of the applications holding a copy of it.

Figure 3:
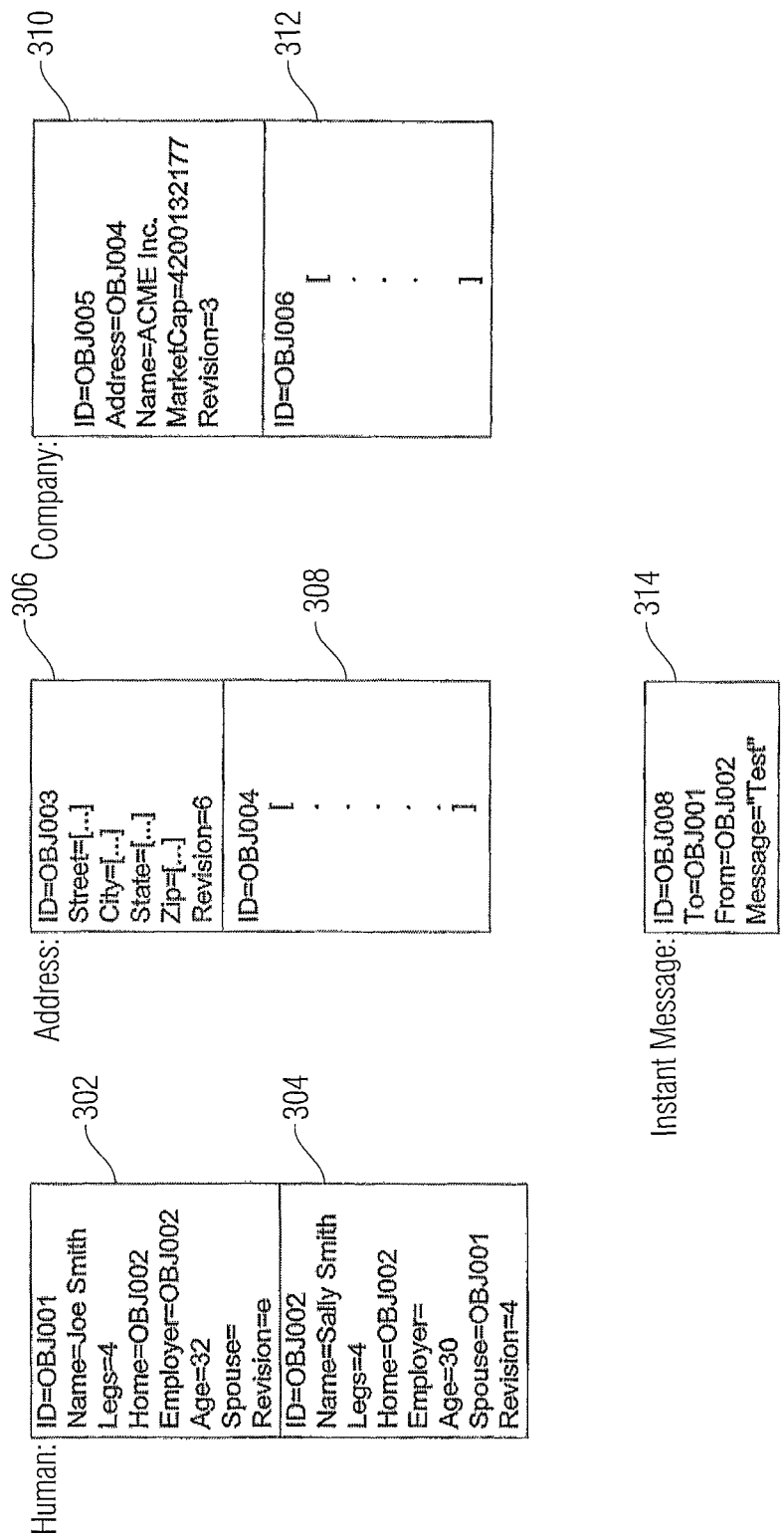
FIG. 3 depicts sample data object contents in accordance with an embodiment of the present invention.

With reference to FIG. 3, a distributed data object 302, 304, 306 is a globally, uniquely-identified, encapsulated set of data consisting of fields, with each field having a well-known name (e.g., legs, age, name), and a data value (e.g., 4, 30, Acme, Inc.). Distributed data objects can be implemented as data containers having, by way of example, the following features:

A globally unique identifier across all time and space. This identifier (e.g., OBJ001, OBJ002, etc.) distinctly identifies this specific data object 302, 304. This identifier can be a string of characters that is automatically generated when a data object is first created using various time and space attributes to guarantee uniqueness. For example, this identifier can be constructed by creating a long binary stream of data formed from the concatenation of the current system time, the Media Access Control (MAC) address of the machine, the process id of the application creating the data object, and a counter that increments for each new data object created.

A revision number. The revision number of a data object is incremented each time the data object is modified by any application. Two copies of the data object anywhere in the system with the same revision number are guaranteed to contain the exact same data.

A modification time. The modification time is updated to the current time each time the data object is modified by any application.

A modification user. The modification user is set to the current user (see sections on login and authentication below) each time the data object is modified by any application.

Data fields. The data fields contain the actual user data for the data object. Each pair has a field name and value. The field name is a string name identifying what piece of data the field is carrying. The value contains the actual data.

Preferably, a data object is managed within or by a particular application 100, 102, 106 as a pointer to an underlying portion of memory storing the data object's information. When applications create new data objects or retrieve data objects as described below, they receive a pointer or handle to this portion of memory. This portion of memory can be cleaned up if the application is no longer interested in the data object through various mechanisms including the conventional technique of reference counting.

Typed Data Objects

Figure 4:
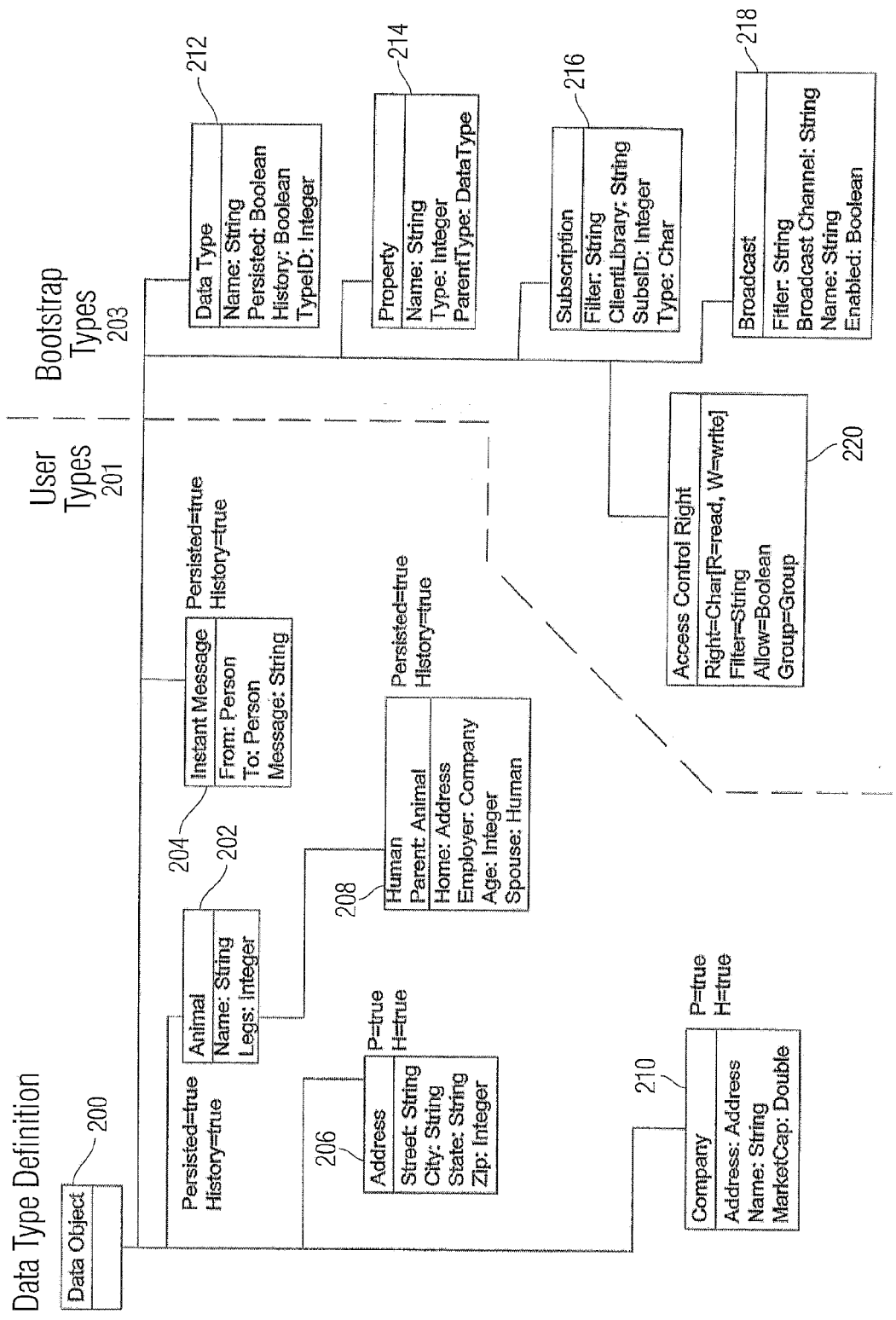
FIG. 4 depicts samples of user-type and bootstrap-type objects in accordance with an embodiment of the invention.
Figure 5:
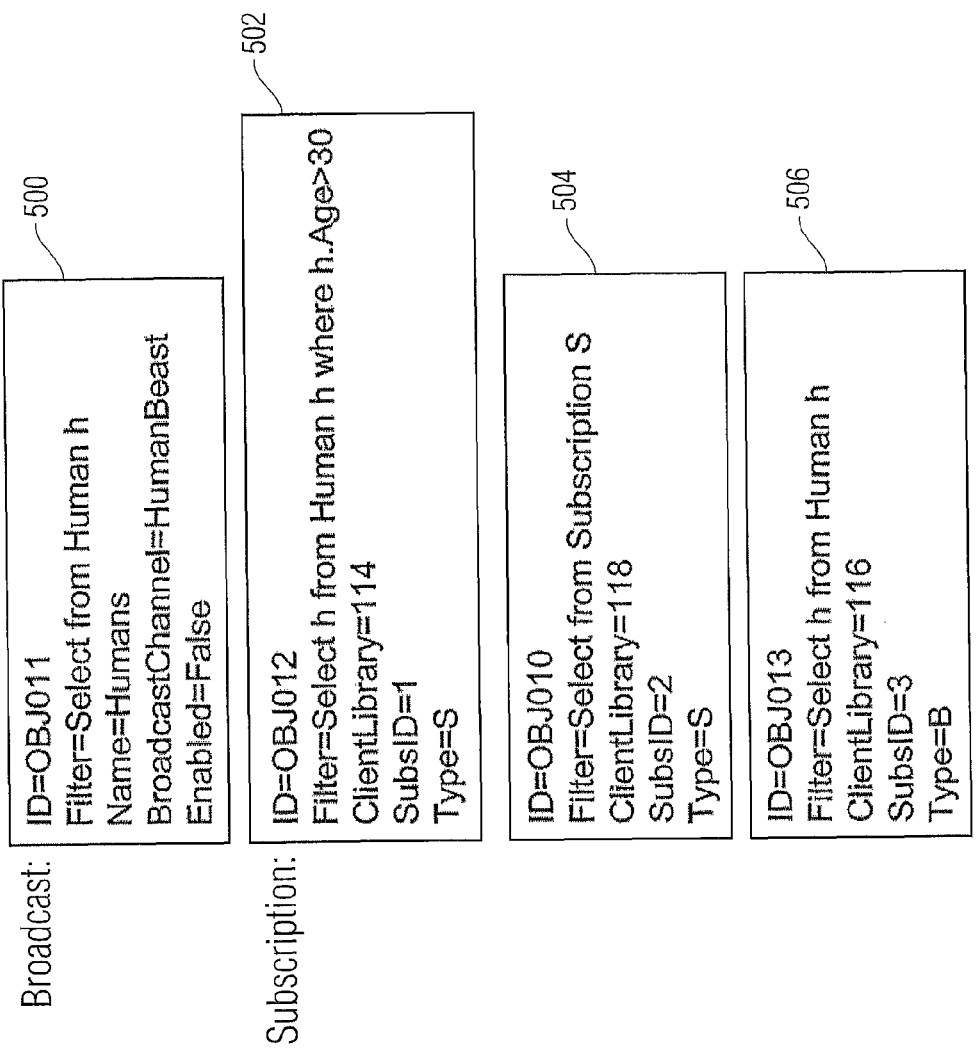
FIG. 5 depicts a subscription object in accordance with one embodiment of the invention.

With reference to FIG. 4, data objects are strongly typed, meaning that each data object is defined by a well-known type definition. Two definitions are User Types 201 and Bootstrap Types 203. However the invention is not so limited, and other data types are within the contemplation of the invention. A type definition describes the semantics (also referred to as the metadata) of an object. It contains a list of the fields that any objects of the given type will contain. It also describes the type of data that can be placed in the value portion of each field. In one embodiment, field types can be such common data types (e.g., "signed integer," "unsigned integer," "double," "character," "string," "datetime," "date," and "time"). These types are called "native" types.

Field value types can also be other data object types within the type definition. In this case, the value portion of a field will actually contain a reference to a data object that is of the given field's type. In one embodiment, these fields are called "linked" fields, because one data object references another data object, and the data reference is a copy of the referenced object's globally unique identifier.

Arrays

Data fields can be arrays of types, such as an array of integers, or an array of linked "Persons". Arrays behave similarly to the conventional concept of arrays in programming languages. Each array has a well-ordered list of values of the given type and length. If values are added to the end of the array, the array's length expands.

Data Object Example

An example of a data object is an object describing a person. A type definition is created, for example, to define the fields that are available for all person data objects. In one embodiment, this data definition appears as the following:

---
TypeName: "Person"
Field1: Name="Name". Type=String.
Field2: Name="Address". Type=String.

---

Field3: Name="BirthDate". Type=Date.
Field4: Name="Father". Type=Person.
Field5: Name="NumberOfPets". Type=Integer.
Field6: Name="Company". Type=Company.

---

The type definition gave the type a name ("Person") and defined a number of fields on the type. Any data object created of this type will have fields of the given names and types as described in the data definition.

The majority of the fields can be native types, but two of the fields, for example, "Father" and "Company" can be linked fields. When a data object is instantiated of type "Person," the field "Father" can be set to link to another data object that must be of type "Person." Likewise, the "Company" field can link to a data object of type "Company."

A sample data object of the type shown above is illustrated below:

---
Type: Person
Globally Unique ID: HHF7KH38J2KA90J
Revision Number: 3
Modification Time: 12/13/2004 13:15:16
Modification User: John Smith
Fields:
    FirstName=Kate Smith
    Address=100 Main St, Anytown, NY
    BirthDate=12/5/1975.
    Father=HG78SHDG3849JHHA
    NumberOfPets=2
    Company=UI8482HH1K48KLK43

---

The data object shown above has a globally unique identifier and revision number which identifies the specific object and what revision of data is being reviewed. The individual fields contain valid values of the types specified in the type definition. The two linked fields, "Father" and "Company," contain as their value globally unique object identifiers of other objects rather than native data. Object "HG78SHDG3849JHHA" pointed to by "Father" is a data object of type "Person" that contains the description of Kate Smith's father.

Inheritance

Data object type definitions are able to inherit from other type definitions Inheritance in this context is similar in nature to object inheritance in normal object-oriented programming. If an object inherits from another object, it will contain all of the fields of the parent object (and its parent's parent, and so on), as well as be able to add its own fields.

Data objects, as embodied herein, take on the basic concept of object oriented polymorphism. In this sense, if an application expects to operate on an object of a given type, it will be allowed to operate on any object of an inherited type. For example, a type "Person" may exist in a system and have an inherited type "Carpenter" that has its own fields (as well as inheriting all of Person's fields). If the application has code that is programmed to read and set the fields of a Person type, then any Carpenter data object could be passed to that code. Because Carpenter contains all of the fields of Person, the application code can operate on the Person fields of the Carpenter without having to know that it is actually operating on a Carpenter.

Linked fields can point to any object that is inherited from the data type of the linked field. A linked field in the data object type definition specifies an object type that instantiations of that field can point to. However, data objects that are of any type that are inherited from the linked field's type can be referenced by the field. In the example above, the "Father" linked field for a particular "Person" data object could point to either another Person object or to a Carpenter object.

Shared, Global Type Definitions

The data object type definitions are globally known and shared throughout a system. Using the example above, every application in the system will know the type definitions for "Person" and "Carpenter." This means that any application that creates a new Person object will guarantee that that specific object has the same fields as every other Person object in the system. This means that two disparate applications will always agree on data that is communicated between them, facilitating integration between disparate components of a system.

Data type definitions can be loaded by an application from, among other locations, a management server 104, a file, or can be compiled directly into the application. Data type definition versioning ensures that all applications 100, 102, no matter how they loaded their data type definition, use the same version of the type definition. Further, versioning ensures that the applications 100, 102 have the same descriptions of data objects when they communicate among each other.

Client Library

In the preferred embodiment, a client library is used by each application that is to communicate shared data and services with other applications and data stores. The client library can be written in any software language, for any platform, and provides several functions, described below. Because the client library for each application can be written in a different language and operate on a different computing platform, each client library is preferably written to interface with an application's native language, e.g., Java, C++, .NET, etc. These libraries can all communicate with each other via a data protocol layer (described below) and facilitate, as an example, a C++ program to share data with a Java program, whether they are on the same machine or on separate machines.

The client library provides a common abstraction to all connected applications, and acts as an adaptor between the applications and the data protocol layer. Regardless of language, each client library allows an application to query for data, create and modify data, subscribe to data, call out to shared services, and do other tasks described below, using constructs most efficient for a given application language. In general, the client library abstraction is kept consistent across languages, so that a Java program that connects to the Java library does not have wildly different semantics than a C++ program that connects to its C++ library.

Each client library preferably provides the following high-level capabilities:

Connectivity to other applications and management servers. The client library is responsible for connecting the application together with other applications and central management servers using the data protocol layer.

Data creation and retrieval. The client library allows an application to create shared data, send it to other applications, and request data from other applications or services (including future changes to that data over time, as described below).

Monitoring capabilities. The client library maintains a communication channel with the central management server 104 to provide status about the connected application and its performance.

In the preferred embodiment, applications link (as appropriately defined by the specific language the application and client library are written in) against the client libraries to access the capabilities described above. The capabilities are exposed by the client library through an application programmable interface (API). Alternatively, the client libraries can be accessed through any application interface technology, such as web services, TCP/IP sockets, HTTP or HTTPS protocols, COM, DCOM, ActiveX, inter-process connection, through a Microsoft RealTimeData (RTD) interface, or other communication schemes. Importantly, the client library is not limited by the nature of the application interface technology to which it is interfaced. By access through various communication schemes, the client library can provide an API to which multiple applications can connect. An application running on a physically separate machine can connect to the client library using a network protocol, such as one of the protocols listed above, to access the client library's functionality. Using this technique, hundreds or thousands of applications can connect to a single client library without having to directly link against the library itself.

Data Protocol Layer

In accordance with a salient aspect of the invention, all communication between client libraries 114, 116, 118 and management server 104 is handled by the data protocol layer 122. The data protocol layer provides the mechanics for specific network communication between applications. The data protocol layer is an abstraction that enables different network communication schemes to be swapped in or out depending on the specific needs of the applications wanting to communicate with each other. The data protocol layer resides between a system's messaging layer and the client library.

The data protocol layer 122 can wrap existing communication technologies, such as commercially available publish/subscribe, TCP/IP socket, or other technologies as appropriate for a given application 100, 102, 106. Each wrapper maps the underlying technology to a common set of messaging services provided by all of the wrappers. In this way, a client library 114, 116, 118 for a given application 100, 102, 106 can be written against a single messaging API, but the specific data protocol layer 122 (which implements the API) can be chosen later. In this manner, the specific mechanism by which messages are communicated between client libraries is abstracted away from the applications themselves.

The data protocol layer 122 is responsible for coupling the messaging-layer independent functions of the client library 114, 116, 118 to the messaging-layer specific functionality of the underlying technology used to communicate between client libraries 114, 116, 118 and management servers 104 (a protocol consumer). Examples of some of the abstracted services that the data protocol layer provides to its protocol consumers follows:

Listen to communication channel. The data protocol layer 122 allows its protocol consumers to register interest in a specific communication channel. Any message sent by any other data protocol layer on the same network on this registered channel can be received by this data protocol layer and forwarded to the protocol consumer. A protocol consumer may listen to any number of channels—when a message arrives at the layer for a specific channel, the consumer will be notified (via commonly used techniques such as messaging queuing or callbacks) that a message has arrived on a channel of interest. Preferably, the channel is a string name. The data protocol layer will use specific semantics of the underlying communication or messaging technology to implement the channel concept, which is well known in the art of messaging.

Send to communication channel. The data protocol layer 122 allows its protocol consumers to send a message to a specific communication channel. This message can be received by all other protocol consumers in the network who have registered an interest in the specific channel.

Examples of the client library 114, 116, 118 use of a data protocol layer 122 include: send messages to other client libraries and management servers 104; inform management servers 104 that the client library has started and authenticate with a management server; register subscriptions with a management server; send query requests to management servers and client libraries; and send object updates to a management server and client libraries when running in distributed post mode. Examples of the management server 104 use of a data protocol layer 122 include: receive messages from client libraries; send responses to querying client libraries; communicate with other management servers about client library registrations and subscription registrations; and send object updates when running in distributed post mode.

A client library and management server registers interest in a channel that is unique to that library or server. When a client library sends a message to another client library or management server, it indicates in the message its unique channel. If the other library or server wishes to send a response, it will send the response on the requesting library or server's unique channel, thus ensuring that the response is delivered only to the requesting library or client. When a client library or management server wishes to establish an event subscription it specifies its unique channel in the subscription so that any event messages in response to the subscription are sent only to the subscribing library or server. Broadcast posts use a channel name that is shared among servers and libraries so that an event message is received at multiple client libraries and servers, which examines the data objects in the broadcast messages to determine if they are interested in the object themselves.

When a client library or management server needs to send a data object to another client library or management server, the sending client library or management server will create a data protocol layer message. A data protocol layer message consists of message fields, each of which has an identifier and a value. The data protocol layer will copy each data object property into a message field. The object's property value is copied into the message field's value. If the property is a linked property, the linked object's globally unique ID is placed into the message field's value. The message field's identifier is set using one of at least four different schemes.

In a first message identifier scheme, the message field identifier is set to be the string name of the data object property. In a second message identifier scheme, the message field identifier is set to be a globally unique integer number representing the data object property. When using this scheme, each time a new data object property is created within the data type definition, it must be assigned a unique integer among all of the data object properties in the data type definition language across all data types. This unique integer is then used in all message fields pertaining to the data object property to identify that that message field contains a value for that data object property.

In a third message identifier scheme, the message field identifier is set to be an integer number representing the data object property that is unique within the data object's data type and any parent data types. When using this scheme, each time a new data object property is created within the data type definition, it must be assigned a unique integer among all of the data object properties in the data type the property belongs to and its parent data types. This unique integer is then used in all message fields pertaining to the data object property to identify that that message field contains a value for that data object property.

In the fourth message identifier scheme, properties are assigned a unique number using one of the numbering techniques above, and message fields are not given any identifier. Instead, the order in which the fields are placed into the message indicates which data object property they pertain to. Message fields are written in the message by the client library in the order of their integer identifier.

When a client library or management server sends a message containing a data object, it also indicates in the message the data object's type and id. Occasionally, a message contains multiple objects. In this case, a single master message is constructed with message fields that each contain a complete data object message themselves, one for the main object being sent, and one for each coupled object coupled to the main object. If a coupled object couples another object, then its coupled objects are also added to the main message, and so on, such that the main message has a message field containing a message for each data object to be sent together.

The client library informs the data protocol layer that it wishes to send the data protocol message on a given channel, the channel determined by where the client library wishes to send the message. The following is a description of one manner of how a client library can ascertain the channels on which to send its messages.

This method assumes libraries only communicate with management servers for specific purposes (e.g., data retrieval, subscription registration, persist and post data, and send monitoring and statistics data), unless explicitly sending events as a distributed post client library. The client library is given a name for a channel that one or more management servers are listening to by its associated application during initialization. The client library sends a message on the channel indicating it wishes to connect to the system. One management server, designated as the primary server, responds indicating whether the client library is allowed to join the system and provides, in priority order, the unique channel names for each management server the client library is allowed to communicate with. The selection of which management server is primary can occur through any number of well-known prioritization schemes. The client library attempts to communicate with the first management server in its list. If that first management server does not respond, it attempts communication with the next server in its list, and so on. All queries, persists, posts, subscription requests, and sending of monitor and statistics data occurs on the given management server's channel. The management server replies on the supplied client library's channel and sends event messages to clients based on their subscription record's channel. Client libraries that are to post messages in distributed post mode can have an in-memory cache populated with subscription records and know the channel names of all subscribing client libraries when sending event messages.

When the data protocol layer translates the data protocol message into a format native to the underlying communication or messaging technology, it will read each message field in the message and write it out in the most appropriate manner for the underlying technology. Various techniques exist that are commonly understood by those in the field.

When a data protocol layer receives a message from its underlying communication, or messaging technology, on a communication channel its protocol consumer has registered for, the data protocol layer translates the underlying message into a data protocol message for its consumer (i.e., the associated application). Techniques to do so exist that are commonly understood by those in the field.

When a client library or management server receives a message that contains one or more data objects, the library creates a data object in memory for each data object that is encapsulated in the message (i.e., a single data object if the message contains one data object, or multiple data objects if the message contains message fields that themselves each contain a message encapsulating a data object). For each data object message, the client library creates a data object of the appropriate type as indicated in the data object message, and provides it with an object ID as indicated in the data object message. The client library populates its properties with the values in the message fields in the data object message. As each message field is read off of the message, the appropriate data object property is located based on the scheme used to write the identifier of the message field (e.g., locate by string name if the identifiers are property names, locate by integer id if one of the integer id schemes were used, or simply populate in order of id if the fields were written out in a well-known order).

The client library can place the object into a data object pool or copy it into an existing object of the same ID in the pool. Alternatively to copying a newly created data object into a data object in the pool, the client library can skip the intermediate step of creating a data object from the data protocol message and simply copy fields out of a data protocol message into the existing data object in the object pool.

When a client library or server sends an event message as described in various sections, the event message contains the data object the event pertains to (or objects, if the object has coupled properties) as well as message fields indicating the subscription ID of the subscription that the event pertains to for non-broadcast events, the type of action that caused the event (including, for example, object creation, object modification, and object deletion) and the event's scope.

In another embodiment, all communication is handled directly by the client libraries themselves without an intermediate data protocol layer. In this embodiment, the client libraries either use their own messaging scheme or use a third-party scheme directly without an abstraction layer and an intermediate data protocol message.

Because data protocol layers are abstractions, it is possible to bridge between multiple data protocol layers, connecting several applications using one data protocol layer with several others using another layer, depending on which layer is deemed most appropriate for the communication among those applications. Data objects and messages are kept consistent between the layers such that every given application can communicate through the data protocol layer with every other connected application independent of which layer is in use.

Management Server

Applications that wish to share data or services, as described below, can connect themselves together using various configurations. In one embodiment, this connection is facilitated by a centralized set of management servers 104. In another embodiment, all client libraries 114, 116, 118 perform the function of a management server. As used herein, the term "management server" means a set of code that is performing the described tasks, whether performed by a standalone server, or incorporated within a client library that is itself performing the functions of a management server.

Management server 104 connects to a data storage device 120 to store and read persisted data that describes a system and its connected applications to manage the operation of the system. Multiple management servers 104 communicate with each other by sending messages over the data protocol layer 122. These messages take on one of two forms. The first form includes normal queries and data publication messages. The second form includes system monitoring messages. The overall purpose is for the management servers to share the following information with each other:

Connected client libraries. Management servers share information about which client libraries are connected to each management server such that if one management server fails, other servers can reconnect with the client library to ensure the library is always successfully part of the system.

Subscriptions. Management servers share information about the subscriptions (see below) that presently exist for each client library such that any management server or client library that is posting data objects knows which other client libraries are interested in the data object.

A new application that wishes to share data and/or services registers itself with a management server 104, preferably by sending a message over a data protocol layer 122 that is read by a management server. The management server 104 verifies that the client library 114, 116, 118 is allowed to connect into the system. If so, it creates a registration for the client library that can be propagated to other management servers. The registration is encapsulated in a data object of a client library registration data type. All management servers subscribe to events on this data type, storing the client library registration objects in an in-memory cache, and will hear of the registration when it is persisted by the first management server. Any subscriptions that need to be created for the client library will be created, for example, by sending a message to the management server. Subscriptions themselves are also created as data objects of a subscription data type. All client libraries and management servers that can post events to subscribers create a subscription against this subscription data type, storing the subscription objects in an in-memory cache, to stay up to date on the full list of subscriptions. If the client library wishes to post a data object update to the system without having to directly send messages to other client libraries (see below), it can use the management server to do so. In one embodiment, the management server will handle persistence of data to a disk-based data store, such as a database. In another embodiment, the management server will perform access control validation, system monitoring, and statistics gathering (all described below).

By using central management servers, the system maintains coherency, as all connected applications and subscriptions within the system are well known at all times, Management servers can be partitioned such that they can balance incoming requests from client libraries among each other and prevent one server from being overloaded and such that they can handle the failure of another management server by taking over that server's client library connections.

Data Store

A data store 120 is a generic concept, and is any component, application, or process that is able to receive data to be persisted over time, store it in a reliable fashion into a physical storage device, and retrieve data based on filter criteria. The most common data stores used in the preferred embodiment are relational databases and memory-based caches, although object-databases, files, and other mechanisms may also be used as data stores without loss of generality. The data store may be implemented in one of an optical storage device, a magnetic media storage device, a holographic storage device, a solid state memory device, or any other memory storage device.

In one embodiment, the management server 104 is responsible for translating data objects into a format that can be stored in an underlying database data store 120 and for translating data coming out of the underlying database into data objects. The management server also translates retrieval queries (described below) into appropriate retrieval queries understood by the underlying data store. Data objects are mapped into rows within the database using well-known object to relational mapping (ORM) techniques. Alternatively, a client library 114, 116, 118 can directly access a data store 120, performing the translation steps described above directly against a data store such as a database.

As an example of memory being used as a data store 120, the management server 104 or client library 114, 116, 118 can use an in-memory data cache as a data store, allowing queries to be run directly against cached objects in memory. Data store access techniques include data editing and data retrieval.

Data Object Type Definition Storage

The data object type definition is itself stored within specific data objects representing object types and their fields, creating a recursive definition scheme by which data objects store data type definitions that in turn define the very objects that stores the definition. Specific data object types within the system are used to store each data object type and its associated fields. The type definitions that define the objects that will store type definitions and fields can be hard-coded into each client library so that each client library knows the basic type definitions of objects that will subsequently contain the full type definitions for all data known within the system. In this embodiment, these basic type definitions are called "bootstrap" types 203. Using these type definitions, the client library can request, from a management server, the full type definitions for all data known in the system.

The elegance of this scheme is that the request for the full suite of type definitions, FIG. 3, can be made using the normal data request mechanisms of the system. The management server 104 can retrieve the full type definitions from an underlying data store 120. Because the data type definitions are themselves stored as data objects using the bootstrap data type definitions 203, the management server 104 can use data retrieval mechanisms to retrieve the data type definitions from the data store 120 and place the retrieved data into data objects themselves. These data objects can then be returned to the client library that is requesting the full set of data type definitions. No additional code has to be written to deal with the transmission and storage of the data type definitions, since the management server 104 already knows how to transmit and store regular data objects.

Additionally, in this embodiment, the client libraries can subscribe to updates to the type definition data objects (subscriptions are described below) just like any other data object. This means that the system can dynamically respond to changes to the type definitions—i.e., any change will be propagated to every client library as a normal data object change. When the client library hears an update to a type definition data object, it can change its internal representation of the type definition on-the-fly, without requiring an application restart.

In this embodiment, because the type definitions are themselves stored in data objects, the type definitions can be persisted to permanent data storage just like any other data object so that new management servers that start up can load the type definitions just like any other data objects.

The type definitions, in addition to defining the fields available on each data type, also define properties of each data type that the client libraries and management servers use to determine how to transmit and potentially store the object. Thus, data types can store several properties about objects of the given type, such as:

Transient or persisted object. The type definition for an object type indicates if objects of the type are automatically stored in a data store by management servers.

When a "Persisted" object is saved by an application through a client library, the object will be stored in a data store by a management server before any consumers who might be interested in the object are notified that it was saved. Transient objects behave slightly differently in that an application can specify that a new object or changes to an existing object are not to be stored in a data store, but should simply be forwarded to interested consumers. This allows rapid dissemination of data that is transient in nature (i.e. is only valid for the brief moment when it was created), or is to be produced in a high enough frequency, or that is required by consumers rapidly enough after production that the volume and delay of persisting object updates of the given type to a data store is not acceptable to the system.

History enabled object. The type definition stores whether every revision of an object should be stored in the data store for persisted objects, or just the latest revision. History enabled objects inherently have an audit trail of their history of edits, as each revision is stored in the data store and can be retrieved. Persisted objects without history enabled simply overwrite the existing revision each time a new revision is saved by an application.

Versions of data object type definitions are tracked. Preferably, a two part version number is maintained for the overall set of data definitions, with a "major" and a "minor" version number.

Each time any data definition is modified, the version number for the data type definitions is incremented automatically. If the modification is considered a "backwards-compatible" change, which includes additions of fields on a type, additions of type, and creation of history on a type, the minor number is incremented. If the modification is not considered a backwards-compatible change, the major number is incremented.

Each application maintains a version number of the data definitions it knows it can operate against. When the data definitions are changed, and when the application first starts up, it checks the new data type definition version number against the version it knows it can operate against. If it detects that the data type definitions are on a different major number, the application has the knowledge that it may not be able to successfully operate against the given data types, and can either inform a user or stop operating. A management server can also ensure that an application is only allowed to start with a data type definition version compatible with the definition version shared among the system, and deny the application permission to join the system if the versions are incompatible.

Preferably, new data types and data type properties are created within the data type definition by an application requesting a new data type or a new data type property against the client library. The client library informs the management server that a new data type or data type property is being created. The management server, in turn, can create a new table for the data type or new rows for the data type property in an underlying data store automatically to store persisted objects of the new type or values of the new property. The management server will add a new data type object or new data type property object into the data type definition and persist the new object. The persist will cause the object to be sent to all management servers and client libraries who have subscriptions against data types or data type properties, passing along the information that the data type definition was changed and how it was changed.

Preferably, the data type definition is described in a file, such as an XML file, that can be loaded into a client library. The client library reads the type and property definitions out of the file and creates the types and properties in the data type definition using the process described above.

Data Creation

Data is created by an application for external use by other applications in the network through a client library. An application uses a call in the client library API, providing it with the data type that should be used to create a new data object. In one embodiment, the call returns a clean, new, data object of the given type with a new unique id and a revision number of zero. It should be understood that a given application's internal use of its own data is not affected by the present invention.

The application can then set properties on the data object. When the object is ready to be distributed to other applications, the application will call a method on the client library to send the object to interested consumers.

In one embodiment, the application can call a method "Persist" which stores the data object in the data store and send updates to interested consumers or the application can call a method "Post" to send the updates to interested consumers. The Post method can only be called on transient objects, whereas the Persist method can be called on either transient or persisted objects. The functionality of these methods is described in the section on data editing, below.

Data Editing

Any object that is loaded within a client library 114 can be edited by the associated application 100, although security rules defining write permissions can prevent writing to an object at the client library level if the connected application does not have adequate permission to edit the object. If the proper permission exists, a client library can edit an object 208, 209 by retrieving a handle 402, 410 to the object 208, 209 (for example, through the object pool 406 or by query) and setting the values of properties on the object. If the object is not "fully faulted", then the object can be fully faulted automatically prior to any values being set on the object.

When an object is first edited within an application (a "clean" object), its revision number can be automatically incremented by one. The object is also marked as "dirty." If updates arrive into the client library for a dirty object, the client library does not apply the updates straight off. Instead, the client library signals the application that a newer version of the object exists elsewhere in the system and marks the dirty object as being a "revision conflict" The application may then choose to re-fault the dirty object such that the newer version known to the system is loaded within the client library as a clean object. Once the application is done editing the object, it is ready to be "Persisted" or "Posted" by the application through the client library.

The Persist call causes the client library to forward the object to the management server to be stored in a data store. Appropriate event messages can be sent to any subscribers interested in the object's current values, or its previous values. The Post call causes the client library to forward the object to the management server 104 to only send event messages to subscribers. Preferably, Post can only be called on objects that are allowed to be transient. Alternatively, the Post and Persist call causes the client library to directly store into a data store and/or into sent event messages.

When a data object is posted or persisted, the client library sends the previous revision of the object along with the object itself. Subscription filters are available to verify whether the object is in-scope or out-of-scope when checking subscription events against the data object by utilizing both the object's current values and its previous values as stored in the object's previous revision.

As an alternative to the application 100 editing the "master" copy of an object 208 in the object pool 406, when an object 208 is first edited by an application 100, the object can be copied by the client library 114. The copy is removed from the object pool, and the handle held by the editing module within the application is re-pointed at the new copy. In this way, the original object in the object pool still receives updates. The copy of the object can have its revision number incremented automatically, and can be safely edited by the application without affecting other components holding handles to the object pool copy. When the application calls "Persist" or "Post" as described above, the edited copy's changes can be applied to the original copy of the object in the object pool, for example, as long as the original copy's revision number is still one less than the edited copy's revision number (indicating the original copy has not since received an update from elsewhere in the system). If the revision number of the original copy is one less than the revision number of the edited copy, then the edited copy's values can be copied into the original copy, all handles pointing at the edited copy re-pointed to the original copy, and the original copy posted or persisted as described above.

Alternatively, the system determines whether to Post or Persist an object automatically. Transient objects are posted and non-transient objects are persisted. Mechanisms can also exist for persisting transient objects to ensure a copy of a given revision is stored within a data store for longer term retrieval purposes than the lifetime of the posting application (e.g. to create template objects). An application may explicitly indicate that it wishes to persist a particular revision of a transient object, or the system may automatically persist certain transient objects when they are first created.

When an object that is not newly created is persisted, the persisting client library or management server performs a conflict check to ensure that the underlying data store does not contain a revision of the data object newer than the revision being persisted. This can occur if another application also edited the data object and persisted a revision first. If the data store contains a revision of the data object newer than the revision being persisted, the persist call fails and the persisting application is notified that the persist failed ("revision conflict").

Data objects may be persisted in transactional-safe batches. If a group of objects need to be persisted together (such that the group is either successfully persisted or none are persisted), they may be placed into a batch by the application and the entire batch persisted. The client library or management server performing the persist will ensure that all of the objects have a newer (or equal) revision number than the revision number in the data store. Only if all of the objects are newer or equal to the version in the data store can the entire batch be persisted. Otherwise, no member of the batch is persisted and the application is notified that the batch failed to persist ("revision conflict').

The persist mechanisms described above require that the data store provides transactional capabilities to ensure objects can be read and written without intermediate changes. There are various well-documented techniques that exist for the various data stores. The data objects can be converted into an appropriate native format for the data store. For a database data store, or a data store that acts like a database, the well-documented technique of object to relational mapping (ORM) is available. Each data object is stored as a row 128, 130 within a table 124, 126 for the object's data type. Each property of the data type is a column in the table 124, 126, with columns for storing the object's ID, revision number, modification user, and modification time. For a data object of a data type that inherits from another data type, a row could exist in each data type table within the hierarchy and contains the respective properties of the object for each data type.

Developing on an earlier example, a Person table could exist in the database with a row for each Person object, and a Carpenter table would exist in the database with a row for each Carpenter object. A row would also exist in the Person table for each Carpenter object containing the Person fields for each such Carpenter object. The management server is responsible for persisting a Carpenter data object into both the Person and Carpenter tables. A number of other techniques exist for storing hierarchical objects, such as creating a single table that contains both Person and Carpenter fields (and leaving the Person fields blank for objects that are just Persons and not Carpenters).

The user that edited the object, the time the object was modified, the revision number of the object, and the object's ID are all stored with the object in the underlying data store during a persist call. When a "history enabled object" is persisted, the client library or management server performing the persist copies the current revision of the object in the data store into a backup location (e.g., a history table for a database) within the data store prior to writing the new revision of the data object to the data store. In this way, every change made to an object that has history enabled is recorded within the data store (along with information on who made the change and when).

Data objects may be deleted by an application by marking an object as deleted and persisting the object. Deletions may be placed within batches with other deletions or normal object updates. If an object to be deleted is of the same revision in the data store as the version the application is attempting to delete, the object is removed from the data store; otherwise, there is a newer revision in the data store and the application will be informed that there was a revision conflict If the object's data type has history enabled, the last revision of the object is saved to the history location within the data store prior to the object being deleted from the data store.

Data objects may be edited by an application such that their data type is changed from one type to another. This is referred to as "casting." When casting a data object of a data type to another data type the client library changes the data object into an object of the new type. All fields from the data object that do not belong to the new type are removed and fields are added to the data object that belong to the new type (where field is defined by the same name and property data type for a given property). In this fashion, fields on the data object of the same property name and data type as the new object's data type are not affected. The new data object may be persisted or posted by the application. A persist causes the data type of the object in the underlying data store to be changed to the new data type. In a database type data store the old object is deleted from the old data type's location in the data store (preserving history, if enabled) and a new object (with the same object ID) is created in the new data type's location in the data store. If the object is persisted or posted, an event message can be sent to all interested subscribers indicating that the object changed type.

Data Set Definition Language

A data set definition language statement is written to describe a set of objects meeting a given criteria. Preferably, this language is a modified version of the popular SQL database query language. An application that wishes to describe data in the system does so by writing a description of the data using the data set definition language. This language is used universally within the management infrastructure 15 to retrieve data as a query or event subscription, describe sets of data objects to be sent in a broadcast mode instead of a point-to-point mode, and define security groups.

This SQL-modified language is built around a statement that selects data objects with a filter set by the application. A data set definition statement indicates a data type and a list of filter clauses. A filter clause is a logical combination of comparisons defined by Boolean operators, each logical combination contains the name of a field on the data type, a comparison operator, and a value to compare the field against. As is commonly understood in the art, the filter's comparison operations can be run against a data object of the appropriate type to determine if the object "passes" or "matches" the filter, thereby matching the data set definition and considered to be included in its described set.

Aspects of the invention can use a statement in different ways. When retrieving data as part of a query, for example, the system attempts to compare the filter clauses against data objects of the given type to determine if they should be included within the set of objects to be returned as a result of the query. Further, when checking to see if a data object meets a data subscription, broadcast filter, or access control restriction, the system compares the data object against all of the data set definitions defined as subscriptions, broadcast channels, or security rules for the given type to see if the data object "passes" the statement (i.e., is included in the set defined by the statement).

By way of example, a data set definition statement to describe all objects of the type Person who have more than one pet could appear as the following:

"SELECT p FROM Person p WHERE p.NumberOfPets>=1"

If this statement was used within a query, Person objects in the system would be searched to discover if the field NumberOfPets is greater than or equal to one. Objects that match the given criteria would be returned to the requesting application.

A data set definition statement allows a filter to be built not just to compare against fields within a given data object, but also to compare against fields in any data objects linked to by the given data object (and any data objects the linked data object links to, and so on). For example, a data set definition statement written to look for a Person who's father is John Doe might appear as follows:

"SELECT p FROM Person p WHERE p.Father.Name='John Doe'"

In the example above, a query ran with the statement would retrieve only Person data objects that have a Father field that points to a Person data object with a Name field of "John Doe." When a client library or management server attempts to match a data set definition statement containing a linked property comparison against a data object, the client library or management server locates the appropriate linked object in an object pool or via query (as described elsewhere) and run the linked property comparison against that linked object. Linked comparisons can be nested any number of times (e.g. "SELECT p FROM Person p WHERE p.Father.Father.Name='John Doe Sr.'").

Data Retrieval

Applications can consume data to describe the data they require abstractly without knowledge of where the data is located or how it is sent to them. The applications retrieve current values of the data they are interested in, future changes to the data they are interested in, or both, again without knowledge of the mechanisms used to retrieve the current values or propagate future changes.

Data can be retrieved by an application in at least one of three ways: by a query, by a subscription, or by a remote procedure call. Data is retrieved by an application from the system by using a data retrieval statement. A data retrieval statement can be a data set definition statement for a query or subscription, or a remote procedure call statement for a remote procedure call.

A query causes a management server to retrieve matching data objects from a data store based on the data retrieval statement (in the form of a data set definition statement). The management server transforms the retrieved data into the appropriate data objects and forwards them on to the interested application's client library. Only data objects that have been persisted to a data store will be retrieved using a query.

A subscription creates an event registration in the system such that any objects that are Posted or Persisted to the system matching the data set definition statement are forwarded onto the interested application.

A remote procedure call sends parameters to a procedure provider to execute code and optionally return objects as a result of the code's execution.

Importantly, the language used to execute queries and set up filters for event subscriptions is the same data set definition language described above. A statement to retrieve a set of objects from a data store as a query may be used to set up a subscription to retrieve all changes (as a result of persist and post calls) to objects that are into-scope, in-scope, or out-of-scope of the filter (see below). As a result, an application may simultaneously perform both a query and a subscription, a capability supported by the client library. In this case, not only can data objects in data stores matching the data set definition statement be returned to the interested application, but all future object changes in the system that match the data set definition statement can also be forwarded to the application as events. By performing both a query and a subscription, the application can load the current state of all objects it is interested in and ensure that each of those objects stay consistent with every other copy of the same object within the rest of the system as modifications occur. This allows data objects to be managed in a distributed and shared fashion such that any application can discover all objects of interest and ensure that those objects are consistent with every other application in the system over time.

The client library ensures that, when running a query and subscription at the same time, that the subscription is created prior to the query being run such that no events are missed between when the queried objects are gathered from their data stores and event messages start being generated for such objects. In one embodiment, the client library will not pass event messages received for objects being queried until the application has run through the recordset of returned objects from the query such that the application sees the query results and events in the order in which they were generated, preferably by queuing the event messages until after the recordset has been processed and only passing those event messages containing newer revisions of objects that were in the query to the application.

Data Object Pool

Figure 6:
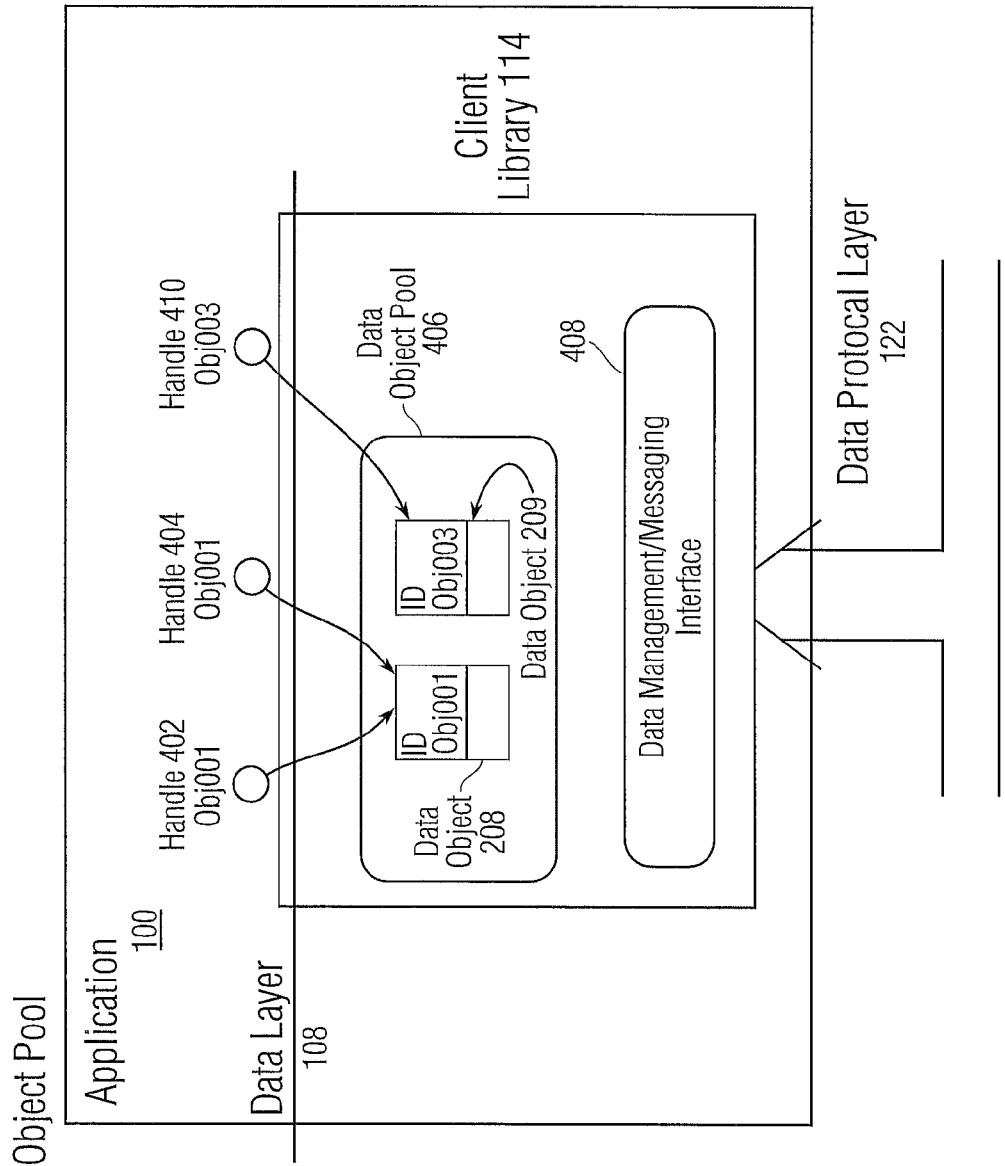
FIG. 6 illustrates a detail of a portion of an embodiment in accordance with the system of FIGS. 1 and 2.

With reference to FIG. 6, data objects are managed by the client library 114 through the use of object pools 406 within the client library. When a data object 208, 209 is created by a client library or retrieved from the system through a client library, the data object will be placed in an object pool. The data objected can be retrieved by query, by arriving as a result of an event subscription, by remote procedure call, by linked object faulting, or by any other method that brings an object from another aspect of the system into the client library. The client library can have any number of object pools—each application can specify the number of pools to create and which pool to use when creating an object or running a specific query or subscription. A data object pool contains a handle 402 to each data object within the pool. As mentioned earlier, reference counting keeps track of how many handles the application 100 has to each data object in the pool. Preferably, if the application stops pointing at the data object in the pool, the client library will remove the object from the pool and free up the memory allocated to the object.

When data objects arrive at a client library the data object pool 406 is checked for the object's globally unique ID to determine if a copy of the object already exists within the data object pool. If not, a copy of the object is created within the pool. If a copy of the data object exists within the pool, the client library checks to see if the incoming copy of the object has a newer revision number than the copy in the object pool. If so, the object should be updated to be equal to the incoming object from the system. One way to update a data object in the data pool is to have only a single copy of a given data object exist at any given time in a pool. When a newer revision of the data object is retrieved, the single copy of the data object can be updated to the new revision. Thus, all application handles to the data object within the pool are automatically handles to the new revision of the object because the object's memory was updated to the new revision. Safety issues between various application threads that might have handles to the data object are handled through well-documented thread safety techniques.

Alternatively, a new copy of the object can be created in the data object pool 406 for a newer revision of the object arriving from the system. In this alternative mode, applications have two types of handles to data objects: a handle that will always point to the newest revision of a data object; or a handle that will point to a given revision of a data object. If a component within an application has one of the former handles, the client library will ensure that the handle points to the new revision of the object if it is updated. If the component has one of the later handles, the client library will not re-point the handle to the new revision of the object. The component can indicate that it wants to re-point itself to the newest revision manually. Thus, not every application component needs to have its data changed behind the scenes when a new revision of the object arrives, either through query or event message.

Alternatively, objects do not have to be placed into an object pool. In this case, each time a new object arrives from the system, a new copy of the object is created in memory and passed to the component within the application requesting the copy. For a query or remote procedure call, this is the component that executed the call, whereas for an event subscription this is the component registered as a callback against the subscription. In this case, an object would not be updated to new revisions, since new copies of the object are created each time a message from the network is received.

Implementation of an object pool 406 permits the newest revisions of objects to be retrieved from any aspect of the system over any communication and request paradigm (e.g., query against a data store, queries or procedure request against other applications, as event messages, etc). Within the object pool, any update to an object is applied in the same way to the object such that the end application only sees it has the newest revision of the object. All communication paradigms appear in abstract to be the same from the vantage point of a data object and its consuming application.

Data Queries

Data queries allow an application to retrieve the newest revisions of objects stored within various data stores. An application executes a query through its associated client library using the data set description language described above.

In its simplest form, a query is executed by a management server 104 against a single data store 120. The management server transforms the data set description into a query or filter that can be run against the underlying data store, executes the native query against the data store, and turns the returned data into data objects. The management server then forwards the data objects back to the requesting client library, which in turn forwards the data objects as a returned set to the requesting application.

The data store can be a database (or a "database-like" technology). If data objects are stored within the database, the management server translates the data set definition language into a database query statement (e.g., SQL for most databases) to retrieve data objects matching the set definition. This includes finding the data tables corresponding to the types requested in the data set definition, and retrieving the objects corresponding to property constraints in the filter portion of the set definition. If hierarchical data types have been split into multiple data tables, the management server correctly formulates a database query to join together the appropriate data tables to retrieve all properties for each level of the appropriate data type's hierarchy. Once the content of the appropriate database rows have been retrieved, the management server translates, i.e., places the content into the data object fields that correspond with the row as indicated by the data object definition. The management server then returns the data objects to the requesting client library.

It is possible for the data set definition language to request data objects from multiple data types simultaneously when performing a query. For example, in the SQL-like data set definition language described earlier, an application might issue a query with a data set definition statement; "SELECT c, p FROM Company c, Person p WHERE p.Company=c AND p.Name='John Smith' AND c.Name='ACME, Inc.'." This data set definition statement returns both Person and Company objects, where the Person object's Name field is equal to John Smith and the Person's Company linked field points to a Company object who has a name of ACME, Inc. This concept is well understood to SQL programmers of ordinary skill in the art. When linked fields are used in a data set definition language statement (e.g., "SELECT p FROM Person p WHERE p.Company.Name='ACME, Inc'"), the management server constructs the appropriate data store query to join together data objects from the requested data type and the linked data types.

The data set definition language also allows individual fields to be retrieved from objects instead of entire objects when performing a query. For example, in the SQL-like data set definition language described earlier, an application might issue a query with a data set definition statement; "SELECT c.Name, c.Address FROM Company c WHERE c.Name='ACME, Inc.'". This query will return only the name and address properties of the Company objects who have a name of "ACME, Inc.".

A data query can be run against a non-database data store, or even an in-memory data cache, which acts like a data store for reading objects. In this case, the result is no different than if the query was run against a database—i.e., all objects in the data store or the in-memory cache matching the data set definition statement are returned.

A single management server can run a data query against multiple data stores, or multiple management servers can run a data query against multiple data stores, or multiple management servers can run a data query against a single data store.

A data type definition may specify that data objects of its type are to be partitioned to different data stores depending on a particular collection of data set definitions defining which objects should be persisted to which data store. Or a specific set of data objects defining data partitioning may exist defining, in the data set definition language, which objects should be persisted to which data store. When the management server persists objects, it persists them to the appropriate data store based on the partitioning rules. Alternatively, a data type may specify that objects of its type should be redundantly stored to multiple data stores (with or without partitioning as described above). Alternatively, the data stores may not be centrally managed or persistent at all, such as when in-memory data caches are used to form data stores.

It is possible for an in-memory data cache, which itself is populated by issuing a query to the system and kept up to date through event subscriptions matching the cache's query, to be used as a data store for other applications running queries. In such a manner, if several applications contain in-memory data caches, all kept up to date with the newest revision of their defined set of objects, there are redundantly distributed copies of the objects residing in memory among these applications. A new application can issue a query that is run against these in-memory caches by a management server, which act as any other data store for retrieval purposes, and the new application retrieves the latest copies of the objects in the system. The in-memory caches can have their data objects backed to a more persistent data store (such as a database), so that querying applications can quickly retrieve results from the caches without having to query a database directly while the data is still safely stored in an underlying disk-backed database. Or the in-memory caches can simply rely on there being enough copies of the caches running at any given time to ensure the object exists somewhere in the system.

To maintain template objects data objects live simultaneously in in-memory caches and in an underlying data store. In such cases, a query must retrieve the objects from both locations.

In all of the situations described above, client libraries and management servers are able to query multiple data stores, which may contain copies of the same objects. Several different schemes exist for determining exactly which data stores should be queried by a management server or client library. Preferably, all data stores are issued all queries.

In a more sophisticated alternative, all data stores that can contain a given data type are identified by the data stores themselves to the management servers, or which data stores contain which types is defined within the data type definition language, and the management servers issue queries only against the appropriate stores for the data types in the data set definition statement being queried. In other implementations, the management server examines the partitioning of data objects among various data stores defined by data type definitions or data store partitioning information and compares the partitioning information to the data set definition being queried to determine which data stores to query.

Once the management servers have determined which data stores to query, the query is issued against those data stores, either simultaneously or in sequence. For in-memory caches or other data stores attached directly to client libraries, this may involve a management server sending a special query request message to a client library and the client library, acting as a management server, executing the query against the cache or data store and returning results to the first management server matching the data set definition. An in-memory cache executes the data set definition statement against the cache to determine which objects in the cache match the statement, and returns such objects.

The management server 104 assembles the returned data objects from the data stores together and returns them to the requesting client library as a record set of returned query results. This record set appears no different than as if the data were retrieved from a single data store. If two copies of the same data object is retrieved (as identified by the same object ID), only the newest revision is kept in the set of objects to be returned to the requesting client library. Alternatively, the management server can forward the objects to the requesting client library as soon as it receives them. The client library's object pool mechanism ensures only the newest revision of the object is applied to the pool's copy of the object.

A data query may specify sorting, grouping, aggregation, or set limiting clauses (as understood within the SQL language). If the management server must query multiple data stores to retrieve data objects for the query, it is responsible for assembling the results into a sorted, grouped, aggregated, or limited result set as requested in the query statement, as is generally understood in the art of databases and record sets. Alternatively, this assembling can be performed at the client library prior to passing the returned objects to the requesting application.

When the management server issues a query against in-memory caches in other applications, it is responsible for remembering the caches it sent the query request to and for ensuring that it hears a response from each cache's client library. If a cache does not return a response (either with data objects matching the query or with zero objects), then the management server is programmed to assume that the cache has an error and indicates to the retrieving client library that the query results may be incomplete (since the error data cache could have had data objects matching the query). Monitoring capabilities provide a better mechanism by which the management server can know which data caches are operational when it sends its query instruction to the data caches, such that it knows which caches to listen to for return results.

The ability to query multiple data caches allows a requesting application to indicate whether a query must go to an underlying data store or not, possibly in addition to running a query for transient objects against in-memory caches. This allows "template" copies of transient objects to be stored in an underlying data store, such that an application can either (a) just retrieve the template objects; (b) receive all template objects and the latest revisions of objects that also happen to be in a repost cache (so the application can know which objects are not stored in a data server, but were at one point available in the system); or (c) just retrieve the latest revisions of data objects stored in a data server.

Event Subscriptions

An event subscription represents an interest by an application to hear all changes in the system to data objects matching a given data set definition statement. This means that all new objects created that match the statement, all changes to data objects matching the statement, and all deletions of data objects matching the statement will be sent to the interested application. Other events can be generated by client libraries and management servers, such as events indicating a query was run, a server started up or ended, or other notifications.

Each time a data object is persisted or posted by an application in the system, the object is compared against all event subscriptions for the given object type. This comparison can occur in several different places. If the object is being persisted, the comparison will take place in the management server that is storing the object in the underlying data store. All persisted and posted objects contain not only a copy of their current properties, but also a copy of their previous properties.

The management server will run through a list of all of its event subscriptions for the given data type, and determine if the object's current values matches any of the subscriptions and if the object's previous properties match any of the subscriptions, indicating the object matched the subscription before any update was made. If the change causes the object to match a subscription or its previous values to match a subscription, a message is sent to the appropriate application that had registered the subscription. This message indicates that a data object was created, updated, or deleted matching the subscription's data retrieval criteria with an appropriate event scope.

If a data set definition statement contains a linked field in its filter, the linked objects can be faulted such that the appropriate linked objects' properties can be compared against the statement's filter. Alternative implementations can maintain data object pools within the management server with caching capabilities (employing such commonly implemented caching schemes as least-recently-used) such that linked objects exist in memory and need not to be faulted to read their properties. Preferably, the management server itself uses a client library, containing all of the logic for creating, editing, and managing objects, creating subscriptions, communicating with other management servers, creating caches, and managing object pools. Creating an object pool in the management server is no more complex than creating one within an application.

If the object is being posted, the posting client library will either forward the posted data object to a management server 104 to perform the subscription check as described above, or run through the subscriptions itself and send messages to interested applications. The determination of which location should perform the subscription check is defined in the distributed post section, below.

An event subscription is set up by an application registering a data set definition statement, either as an independent action or as part of a query, by calling an appropriate method on the client library. The client library can create an event subscription by sending a message to a management server to register a subscription. The management server creates a data object of a well-known, event subscription data object type, representing the new subscription. This data object contains the data set definition statement and an indicator of which application created the subscription.

Changes to event subscription objects themselves are automatically broadcast to client libraries. In this fashion, every management server 104 and client library 114 that sends or can send event messages (distributed post libraries) receives a data object update message for each event subscription object that is created, modified, or deleted within the system. Because of this, the same code that creates, updates, and posts objects, and listens to events on objects is able to be used to actually create, update, and post event subscription objects themselves, and listen to changes to event subscription objects. As a result, every management server and applicable client library in the system that needs to know the list of event subscriptions will always be up-to-date with the current list of subscriptions.

Event subscriptions are run against both transient and persisted data, which means that the same language and semantics are used to retrieve data from a database, subscribe to changes to data in a data store, and subscribe to events from "transient" data that is never stored in a data store. All the functionality of a shared type definition, linked fields, and object-oriented data through inheritance are available to both persisted data and non-persisted data.

Event subscription processing within a management server can be optimized by combining event subscription data set definition statements for the same data type together. Rules engines, active databases, database triggers, complex event processing, and publish/subscribe mechanisms are known in the art and set forth how multiple data set definitions can be combined together to allow objects to be compared against a large number of event subscriptions in a highly optimized fashion.

Client Library Event Handling

When an object creation, update, or deletion message is received by the client library for an interested application, the client library will create or update a copy of the data object in the appropriate pool where the subscription was created as described in the section on object pools. Depending on the implementation, this could mean a new copy of the data object was created for the new revision or an existing copy of the data object was updated to the new revision.

A "callback" can be specified by an application when it creates an event subscription to be used to notify the application that an event message was received. When the attached client library receives an event message, the specific data object that was updated is passed to the callback as well as the type of event (including, new object creation, object update, or object deletion). Additionally, the scope of the event is preferably also passed to the callback.

Subscription Scope

Event messages contain the "scope" of the event. The scope of an event describes the change in a data object in relation to the data set described by a subscription's data set definition statement. The scope indicates whether the particular change to a data object that caused the event message caused the object to match or not match the subscription's data set definition statement filter. At least three types of scopes are possible:

Into-scope, which occurs when a change to a data object that previously did not match a subscription's filter (the previous values of the data object do not match the filter) causes the data object to now match the subscription's filter or on the creation of a new object.

In-scope, which occurs when a change to a data object that previously matched a subscription's filter causes the data object to still match the subscription's filter.

Out-of-scope, which occurs when a change to a data object that previously matched a subscription's filter causes the data object to no longer match the subscription's filter, or causes the deletion of an existing object that previously matched the subscription's filter.

If the change to a data object causes it to not match any of the scopes above for a given subscription, then no event message will be sent to the interested application. To determine a data object change's scope, the event subscription processing logic can run through each subscription for the data object's type twice. The first time, the object can be checked against the subscription's filter to see if the data object currently matches the filter. The second time, the object's previous revision can be checked against the subscription's filter to see if the data object used to match the filter before the changes. The results of these two comparisons can provide the event scope for an event message sent to the subscription's application. Other approaches can be used to track and determine changes of scope as understood by those of skill in the art.

Data Caching

Clients can define in-memory caches as a mechanism to store handles to data objects matching given filters. A data cache is a means for an application to locally store copies of data objects it is interested in such that the application can always read the data objects without having to query them from the system or wait for updates to arrive in event messages.

An in-memory data cache can be populated by the application directly adding objects to the cache, or by supplying the cache with a data retrieval statement accompanied by the instruction that the cache populate itself either by query, by event subscription, or both. Alternatively, the cache can be populated by the results of a remote procedure call (with or without a subscription created in the process). If the data cache is to populate itself by query or remote procedure call, it issues the appropriate retrieval statement against a management server. The cache maintains a list of all objects returned from the management server.

If the data cache is to also to create an event subscription (or only create an event subscription), it does so against the client library and provides itself as a callback to be called by the client library when events are received for the subscription. As event messages are received by the client library, the callback within the in-memory cache examines each event to determine if the event is an "in-scope" or "out-of-scope" event. If the event is an in-scope event, the in-memory cache adds the data object in the event into its list of objects. If the event is an out-of-scope event, the in-memory cache removes the object from its list of objects. The client library object pool ensures the data object itself is updated to the new values in the incoming event.

As a result, if the in-memory cache is subscribing to events, it always maintains a list of data objects matching the subscription query. The client application expects that this list of objects is the same list that would be returned by running a query, except that the in-memory cache is updated as the data is changing in the system.

Data set definition statements can be issued against an in-memory cache directly to find objects matching the statement that reside in the in-memory cache. The same language can be used to issue queries and event subscriptions to search an in-memory cache for objects. This provides for a desirable retrieval scheme, as the application can pre-cache objects it might be interested in within an in-memory cache. To find smaller subsets of those objects, the client library does not have to go over the network and cause a management server to issue the appropriate query to servers and data stores to find a specific set of objects.

Initial Values

Two mechanisms are provided for retrieving data, queries and subscriptions. When an application wishes to get the current revisions for all data objects matching a filter, the client libraries and management servers can run a query against a data store. However, if the data objects in question are transient objects, the application is not guaranteed to retrieve the latest revisions because those revisions may have been posted and have not been persisted to the underlying data store.

To retrieve the current revision of transient data objects from servers that have the latest copies of objects that are transient, and may not have their latest revisions stored in a data store, there are two different mechanisms available: a "repost cache," and "initial value queries."

Repost Cache

With the repost cache mechanism, when an event subscription is run against a transient object, the client library posts a special "repost instruction" data object. This data object contains the filter portion of the event subscription. Various components of the system automatically subscribe to events on repost instructions, and respond by immediately re-posting the newest revision of the data objects they have in memory that match the given criteria. By doing this, the subscribing application will receive the latest revision of the transient objects.

A specialized variation of the in-memory cache described above, a "repost cache," can subscribe to events on repost instruction data objects and Post all objects in the cache matching the filter in the repost instruction. Several variations are possible for components that use the repost cache:

In systems where generally a single producer produces and updates a given set of transient objects, that producer can be responsible for keeping a local repost cache and placing all of its produced objects into the cache.

A dedicated caching server can have repost caches that subscribe to events on configurable filters describing sets of objects, and as a result keep themselves up to date with all objects matching the given filters. By using a repost cache, this server also posts data objects to applications creating subscriptions against objects in the repost caches. Multiple copies of a caching server can be run with their repost caches configured to work together as a failover unit as described below.

The initial values retrieval mechanism described above is an "asynchronous" means for retrieving the latest data object revisions from a server's cache. This is because the requesting application issues an event subscription as normal and starts to listen to events. The application is now free to perform other tasks. As the repost caches receive their repost instructions, they Post the current revision of data objects matching the repost filter, thereby causing event messages to be sent to the application containing the data objects. The application's client library processes these events as normal incoming events and fire callbacks into the application, interrupting the application as the events are received.

In the second, "initial value queries," mechanism, data retrieval queries can be run against the repost caches described above to provide a "synchronous" means of retrieving the latest revisions of data objects that are not stored in a data store. This mechanism was described in detail in the data retrieval section, where in-memory caches act as data stores for data retrieval purposes.

In both mechanisms, the mechanisms for data retrieval is abstracted away from the application such that the application only has to issue a query against a description of data the application is interested in without knowing where the data is stored (a data store or in multiple servers).

Distributed Shared Memory

Data objects act as distributed shared memory across application and network boundaries. Any application may query for and subscribe to changes in objects it is interested in. Because changes made to the objects in any application propagates to the subscribing application, and two applications can subscribe to the same objects, those two objects can effectively "share" the object among themselves. Changes made by one propagate to the other. In this fashion, the object becomes, in principle, a set of "shared memory" among the applications.

Distributed Data Object Pointers, Linked Properties, and Object Faulting

The linked field capabilities described above form the ability to manage "distributed data pointers" across multiple applications and computers in a distributed computer system. When a data object is retrieved by a client library, or arrives via a subscription, linked fields contain references to the data objects they are pointing to. These references can comprise the globally unique object id of the referenced objects, for example.

If the linked fields are read by a portion of user code, the client library 114 examines the object pool 406 that contains the parent data object to determine if the linked object exists. If it does, it is provided to the application trying to read the linked field. Otherwise, the client library issues a query to retrieve the linked data objects (if those objects are stored in a data store), thereby placing the linked object into the object pool, as well as returning it to the requesting application. In the present context, this overall process is referred to as "faulting" the linked object.

As a result of faulting, the system allows for distributed data references to objects to be passed among applications, either as references in linked fields or just as simple references themselves (as described in the remote procedure call section, below).

Whenever a reference is accessed, the corresponding data object is faulted by the client library. By taking advantage of the query mechanism described above, this object can exist either in an underlying data store or in another server with a cache acting as a data store The query mechanism locates the data object, wherever its latest revision is located, and provides it to the faulting application.

In-memory caches can be used to efficiently pre-populate the object pool with objects that are frequently faulted. Many applications create in-memory caches with queries that select these frequently faulted objects. As described above, these caches maintain themselves up-to-date with the data objects in the system matching the caches' queries, thereby keeping the object pool filled with these objects. If a data object linking to one of these cached objects is accessed, the client library can retrieve it from the local data object pool without having to issue a full fault query to a management server.

Coupled Objects

Applications can have a series of objects linked together by linked fields, typically when there are multiple instantiations of the system. These objects are related to each other in a way where several of the connected objects may be updated together, and reading an updated copy of one of the objects while reading a non-updated copy of another object, results in an invalid state. For example, if a data object describes an invoice and has a field that is an array linking to a series of data objects that describe the line items on the invoice, it does not make sense to receive an update on the invoice without also receiving updates on the related line items. If an application were to hear one update before the other, it would have an incorrect picture of the invoice until all the updates were received.

For this reason, data object coupling is supported. In the data type definition, linked fields can be marked as "coupled" fields. When a client library Posts or Persists a data object that has coupled linked fields, all of the objects that are referenced by the corresponding coupled fields are sent in a single message along with the parent object to be persisted or posted together with the parent object. When a client library that has subscribed to updates on the parent object receives the parent object's event message, the same message will contain the coupled objects as well, and all of the objects are updated together by the client library before indicating to the corresponding application that an object update message was received.

Point-to-Point and Broadcast Posts

Event messages containing data object updates can be sent in at least two different ways, either as a point-to-point message, or as a broadcast message. Point-to-point messages are sent directly from a management server or client library generating the event message to a subscriber whose subscription filter matches the update. The exact transmission scheme by which the message is sent from the sender to the receiver is handled by the data protocol layer, but to the client libraries involved, the message was sent from one sender to one receiver.

Broadcast messages are sent from a management server or client library generating an event message to any number of client libraries that might be interested in the event. Broadcast messages require less network bandwidth, as only one message is sent per update instead of one message for each subscription per update. The underlying message layer determines how to send a single message from one sender to multiple receivers.

The determination of whether to send an event as a point-to-point message or as a broadcast message is made by the client library or the management server sending the message, and is based on a set of data objects describing broadcast "channels." A broadcast channel is a single data object that contains a data retrieval filter that describes a set of objects whose updates are to be sent by a broadcast mechanism.

A point-to-point event message is sent by the underlying data protocol layer to the correct receiver and also contains a field indicating the subscription that was matched that generated the event message. A broadcast message is sent by the underlying data protocol layer to a group of listeners listening to the channel (the channel can be a string name that is used by the underlying data protocol layer to define a group of receivers as best provided for in the underlying messaging system). The event message also contains a field indicating the channel that the message was sent over.

When a client library issues a subscription request for a data type that has broadcast channels established for it, the client library listens on the broadcast channel for incoming messages. This happens when the management server processing the subscription request discovers that a broadcast data object exists that has created a broadcast channel for the data object type the client is creating a subscription for. The management server returns, in its subscription acknowledgement message, the fact that a broadcast channel exists and a "local filter" to run on event messages received on the broadcast channel. Because the channel is usually defined by a broad filter that may match a wide number of objects of the given type, and a subscription query is often selecting a narrow range of objects, the client library needs to ensure that the event messages it processes match the subscription its client application registered.

The management server returns a filter to be run locally by the client library on messages received on the broadcast channel that filters those messages down to only updates on objects the local application subscribed to. This local filter can comprise a copy of the filter in the original subscription request.

When a management server or client library sends an event message, it first compares the relevant data object against the filters defining broadcast channels for the data object's type. If any match the data object, the object is sent along the given broadcast channel. If no broadcast channels match the data object, the object is compared directly against the subscription records for the given data type as described earlier, and corresponding event messages sent as point-to-point messages to the correct subscribers. Broadcast channels allow the appropriate routing mechanism (point-to-point or broadcast) to be chosen based on properties of the data object being transmitted itself.

When a subscriber hears a broadcast message on an incoming broadcast channel, the client library runs the data object in the incoming broadcast message against its local event filters set up by the management server. If the data object passes any of the local event filters (this matching can comprise the two pass process described above to determine if the object is in or out of scope), then the message is passed along to the data object creation, pool lookup, and event callback code as described above. To the end application, there is no difference between an object received as a broadcast message and an object received as a point-to-point message. The mechanics by which a message is transmitted are completely abstracted from the application. A system operator can configure the data objects for sending as either broadcast messages or point-to-point messages.

Distributed Post

Client libraries 114 can be enabled to send event messages directly instead of relying on their connected management server 104 for this service. These client libraries must maintain a list of event subscription data objects and broadcast channel data objects in in-memory tables in order to perform the same function as a management server.

Security and Access Control

Security can be handled in a manner similar to querying and establishing broadcast queries, and uses the data definition language described above. For instance, data objects can exist that describe users who can connect to the system. Each application that connects to a client library must provide authentication credentials (often a username and password, although credentials can be retrieved from existing authentication systems such as Windows Active Directory) to determine which user data object to link to the current client library's active "session." All operations performed by the client library take place as part of the given session. Client libraries can also be capable of maintaining multiple sessions, each with its own authenticated user, for handling multi-user situations such as a web server that is processing requests from thousands of web users.

Data objects exist that define user groups. User groups can have any number of users assigned to them. Data objects also exist that define access control permissions. Access control permissions can be assigned to groups and users. The following access control permissions can be configured within the invention:

Read permission. A read permission is defined by writing a data retrieval filter that describes a set of data that either can (allow) or cannot (deny) be read by a group or a user. Whenever a data object is to be sent to a client library, either as a return value in a query or as the data object in an event message, the read permissions are checked for the corresponding library session's user and the user's groups. If any read permission's filters for the given data type match the object, the corresponding permission is set for the object (as described below). If the result is that the session is not allowed to read the object, it is not sent to the application.

Write permission. A write permission is defined by writing a data retrieval filter that describes a set of data that either can (allow) or cannot (deny) be written by a group or a user. Whenever a data object is written by a client library, the write permissions are checked for the corresponding library session's user and the user's groups. If any write permission's filters match the object, the corresponding permission is be set for the object (as described below). If the result is that the session is not allowed to write the object, the write is not processed, no data is written to a data store, and no events are generated.

In one embodiment, permission data objects also have a priority field that indicates the order in which multiple permissions that match a given data object should be processed. Multiple read and write permissions that match a given data object operate using the well-known allow/deny permission scheme. Deny permissions prevent an object from being read or written and allow permissions allow the object to be read or written. The priority of the permissions sets an order in which these permissions are checked. The final result as the permissions are checked is the determination as to whether the object can be read or written.

Read and write permissions are run within a management server for each object being read and written. Write permissions can also be checked in a client library as an application modifies an object to provide faster indication to a user that they are violating a write permission. Because objects that are to be sent over broadcast channels may be sent to a large number of clients, read permission checking for objects sent over broadcast channels is preferably performed on the listening client at the same time the client performs its local filter check on the event subscription.

Efficient Data Transmission—Delta Messages

The client libraries and management servers 104 preferably take an optimization path when sending data between various components of the system. To improve transmission time efficiencies even more, the data type definition for an object may specify that event messages for an object can be sent as a "delta" message. A delta message contains only the fields that changed between two revisions of the data object. This limits the number of fields that must be sent in an event message and therefore reduces bandwidth requirements.

When a management server or client library doing distributed posting creates the event message for a data object, it checks to see if that data object should have event messages sent as delta messages. If it should, the data object then checks to see which fields in the data object have changed. Only those fields are placed in the resulting message. The same check is done on all coupled objects—only coupled objects which have any fields that have changed are placed in the message, and only the fields themselves that have changed are placed into the message for the coupled objects.

When an event message is being sent as part of a response to a repost instruction, or a data object is being sent as a response to a query, the entire data object is sent so the receiving application can get a complete copy of the object. A client library receiving delta event messages will ignore delta event messages if it does not have a complete object in memory, ensuring that no incomplete objects exist in memory. Only after a full copy of the object has been received, such as in the situations described above, and placed into memory will delta event messages be allowed to update the object.

Because each revision of a data object has a corresponding revision number, a client library knows if a delta message is missed. If a message is received with a revision number that is not the current revision number stored in memory plus one, then a message was missed. In this case, the client library automatically posts a repost instruction to re-read the full data object with all of its fields.

Remote Procedure Calls with Updates

In addition to queries, the system also supports remote procedure call capabilities to retrieve data. Applications that wish to provide on-demand services to the system register "procedures" or "services" with the system. A procedure can be registered through a call on the client library's API. The client library in turn can send a procedure registration message to a management server, which creates a data object that contains information about the procedure, such as its name, the parameters (data object types) that can be provided to the procedure when invoking it, and where the procedure (which application) is located.

When an application wishes to call a procedure to retrieve calculated results from the procedure, it executes a procedure call against the same generic data retrieval client library API that was used to execute a query or subscribe to events. This call is written using a text based language similar to the query language, but contains the name of the procedure to call and the parameters being passed to the procedure. An example is shown below.

An application might register a procedure of the following name, with the following parameters, and the following return parameter:

Name: SampleProcedure
Parameters: Integer, Double, Person, String
Return: Company Procedure parameters can be types of data objects. In this embodiment, the parameter types can be considered to either be "value" types or "reference" types. "Value" types can have a copy of the data object passed into the parameter sent to the procedure. "Reference" types can send the globally unique id of the passed data object. The operation of these two mechanisms is described below.

An application can invoke the procedure with the following statement:

"EXEC SampleProcedure(1,3.2,'JG380QJ918CJ43', 'Test')"

In the example shown above, SampleProcedure is a procedure registered by an application and stored in a procedure data object. It takes several parameters, an integer, a double, a globally unique id for a Person data object, and a string. The client library being called is responsible for turning the procedure call into a message and sending the message to a management server. As mentioned above, all value parameters that contain data object types have the data object being referenced coupled to the procedure call and sent in the same message, Reference parameters have the globally unique id of the referenced data object sent along in the parameter message.

The management server locates the appropriate application providing the procedure and sends the procedure call message to that application. Alternatively, a calling client library can send the procedure call message directly to the application providing the procedure.

When the client library application that is providing the procedure receives a message indicating that it is being called, it loads all data objects passed as values into the local data object pool, and invokes a callback on the application providing the procedure. This application can perform the calculations it needs to based on the input parameters. Any attempts to access parameters passed by reference act just as any object reference links. The referenced object will be located in the object pool. If it does not exist in the object pool, the client library can automatically fault the referenced data object.

The procedure can return data to the caller. Data is returned as a set of objects in the same way data is returned as a set of results from a query. Data objects of the return type are returned to the procedure caller as a list of data objects just as objects matching a data query are returned as a list of objects. A procedure's return results can be objects that already exist in the system or new objects. A procedure's return results can be cached in an in-memory cache by the application.

Because a procedure call is made through the same client API through which queries are made, and the results are returned as data objects just like query results, a client application can call a procedure through the same semantics it makes a query call, with just a different text string describing the call, just as described above.

A procedure can also set up a subscription so that it can update the data objects it returns in the future. Many procedure requests are made to calculate values and to also set up a calculation in a procedure provider that continues to run as inputs to the calculation change, modifying the results over time.

If a procedure provider is to update its results over time, and the caller of the procedure indicates a subscription desire for future updates, the system establishes an event subscription that matches the returned results. This occurs by the application's procedure code building a subscription filter that it matches the returned results and any future data object changes it might make that are to be passed to the caller as events over time. The procedure provider registers this event subscription on behalf of the calling procedure using a method provided by the client library, effectively creating a normal subscription record in the subscription data objects matching its own returned results. Then, if the procedure application makes a change to any returned data objects later in time, it Posts or Persists the change as normal, which is recognized by the event subscription the procedure provider created for the client application, sending the update event to the application.

A procedure call can be made together with a query as a single data retrieval statement, providing data as if it were a data store and allowing a data set definition statement to further refine results returned by the procedure. The data set definition statement specifies that it wishes to retrieve data objects from a procedure instead of a data type, and optionally filter the objects based on filter criteria. A statement such as the following can be executed against a client library:

"SELECT p FROM FindAdultMalesOver(30) p WHERE p.Company.Name='ACME, Inc.'".

In the statement above, which is a modified form of a data set definition statement, the procedure FindAdultMalesOver can be executed by the management server as a normal procedure. The returned data set objects from the procedure (e.g., Person objects determined to have an age over the input parameter "30"), which look no different than resulting data objects returned from a data store, can be further filtered by the data set definition to include only those Person objects with a Company field pointing to a Company object with a Name field of "ACME, Inc."

The filtering on the procedure return results can be performed either at the management server or at the client library. This mechanism allows extremely complex data requests to be created by data consumers, all with the same request language and data object return path.

Object Hooks and Local Object Properties

An application 100 can inform its attached client library 114 that it wishes to have application specific code executed when specific events occur with a data object, called "object hooks." Object hooks may be registered by data type and are called by the client library 114 when specific actions occur to a data object of the given type in the application 100. For example, an object hook can be registered with a client library to be called when an object of a given type is created, deleted, loaded, faulted, modified, or has an event, among others. If a specified action occurs on an object of the type the hook was registered for, the client library calls the registered callback in the application code and passes it the object as well as the action that occurred.

For example, an application registers a callback against the Person data type on "create" actions. Any time a component with the application creates a Person object, the client library 114 calls the callback code with the newly created Person object. The callback can then execute any code it deems fit before the creating component receives the new object. Object hooks allow an application to install application specific code (often in the form of a library included in many applications that deal with the same data types) that executes within the context of the client library.

Similarly, applications may register "local object properties" on data types, registering a "setter" and "getter" callback locally with their attached client library. Local object properties are new properties that are added to a data type only within the application. To any component within the application that examines the data type or objects of the data type, the properties appear alongside the system-wide properties as if they were the same as system-wide properties. However, when a component attempts to set the value of one of the local object properties, a callback is made to the "setter" callback by the client library. This application specific code can respond to the set call to perform any action it deems fit, such as setting other, related, system-wide properties on the data object. An attempt to read an object local property by a component within the application causes a call to a "getter" callback, which returns a value that is passed to the component accessing the property. This callback generally computes the returned value from other data in the application including possibly system-wide properties on the object (or other local object properties).

Local object properties allow fields that can be calculated off of other fields to be attached to data objects that do not need to be transmitted across the network or persisted into a data store. Components within the application do not distinguish the calculated fields as being different than the system-wide fields on the system-wide data type that are transmitted across the network and persisted into a data store.

Data Store, Query, and Protocol Versioning

Version numbers of its data store data format, query format, and messaging protocol format are handled similar to how version numbers are maintained on data type definitions. A version number is recorded for the format used to write data into the underlying data store. This version number is incremented if a new version of the management server changes its format. When a management server connects to a data store, it verifies that the version number of the underlying data store is the same as the expected data store version number. If the number is not the same, the management server reports an error that the data store must be upgraded to the new format.

Similarly, a version number for the query format and underlying message protocol format is used to turn data objects and events into messages (as well as handle other messages between components of the system such as connection and login messages, subscription messages, procedure call messages, etc). When a client library starts up, it can check its protocol version against the version reported by the system to see if it is be able to communicate with the system (a generic, unchanging message format is provided for requesting the protocol version number of a system). Similarly, the application itself can check the query version number of a system against its known query version number. If version numbers do not match, the application will fail to start-up, indicating to a user that the application needs to be upgraded to handle the new, incompatible, query or protocol changes.

Transient Object Templates

Transient data is not required to be stored in an object data store. However, since this data can be located in different applications with repost caches that may or may not be operational at any given time, it is useful to have a central repository of the transient objects that are available within a system. For this reason, objects that create transient objects preferably persist the first revision of a new transient object they create. This revision is referred to as a transient object template.

From this point forward, the application posts changes it makes to the transient object. Those changes are placed in the repost cache and sent to any interested applications. The applications retrieve their initial state of the transient objects by either retrieving them directly from the repost cache or by querying the data store for the templates and executing an initial values repost instruction as described above. By performing the later operation, the applications are informed of all of the transient objects that they might be interested in and can determine which objects are being updated by a given server at the present time (those objects that receive event messages as a result of the repost instruction).

The template objects also allow an application that is changing the transient objects to reuse the same objects if it shuts down and starts up again. By querying the data store for the transient objects it might be interested in posting on start-up, it ensures that it reuses the same objects instead of creating an entirely new set of objects representing the data it wishes to post and instead of posting those objects and thereby informing every subscribing application of two objects representing each piece of data the posting application is updating, namely: the object the posting application was updating before it shut down, and the object the posting application created and updated when it restarted.

Template objects also allow two different servers to operate in a redundant, fail-over mode, whereby each server loads the same initial set of transient objects and updates them with changes over time, but only one server posts the changes to interested applications. If the first server dies, the second server can immediately start posting its changes to the objects, and since it is using the same objects as the first server, any interested applications see the changes arrive as changes on the same set of objects, not as a new set of objects.

The client libraries handle revision numbering automatically when using transient object templates. Each time a posting application reads the transient object templates from a data store, it reads an older revision number (since the object was updated in an application and posted without being persisted, the latest revision number known by all running applications in the system will be later than the revision number in the data store). The client library on the posting side flags the first transmission of the data object to interested clients with a flag indicating there was a revision number reset. All interested applications that receive this event message will not ignore the data object (since its revision number is earlier than the revision number of the data object in memory), but instead replace the revision in memory with the incoming revision, including the reset revision number.

Distributed Calculation Model

A distributed calculation model can be built within a series of applications. Each application can register interest in input variables it is concerned about, which are stored as data objects, and produce output variables as data objects. If each input and output variable is stored as a template transient object in the data store, each application will always load the same input and output variables on start-up. By responding to events on input variables, calculating outputs, and then posting outputs, one system can propagate any change along to every other component of the system that is dependent on that change.

Because of the fact that data objects are transparent to listening applications, not all variables must be constantly updated transient objects. Some variables can be stored as persisted objects that are updated periodically and saved into a data store. The components of the distributed calculation model do not need to know this is the case, and in fact, the variables can be made higher-frequency and transient later without changing any application code.

Monitoring and Failover

There can be monitoring and failover capabilities built into the system. Each client library that wishes to be monitored in the system is responsible for sending periodic status and heartbeat messages to the system. One or more management servers listen to these messages and record which applications are operational and their status. If an application is expected to be operational because it reported its status as "running," but no heartbeat message is heard in a defined interval, the management server 104 is programmed to assume the application died without reporting its status as "down."

The management servers responsible for monitoring heartbeats create data objects representing each running application in the system and set fields on the data objects indicating each application's operational status. By using this mechanism, any application in the system can query the data objects representing application status and know whether any given application is running or not.

Each application reporting its status indicates an "address" for the application. The address is a unique name that identifies that instance of the application. The management servers can prevent two applications from running with the same address. Every application that wishes to be monitored requests permission to start from a management server. The management server refuses permission to start if an application with the same address is already running. The management server also supports user based control over whether a given application can start or not by using procedures as described above. Each request to start is translated into a procedure call made to a user-supplied "GrantPermission" procedure (if it exists). If the procedure does not indicate that the request is to be denied, the monitoring server allows the application to start.

The management server can also maintain groups of applications together as monitored groups. A monitored group is a data object that contains an array of monitored data objects that make up the group. If all of the data objects within the group are reported as operational, then the group's status is set to "running." If only a set number of data objects within the group need to be operational for the group to be considered operational, that set also can have the status of "running." If a monitored application's status changes (and therefore the monitor server changes the status on the data object representing that monitored application), then the group's status is changed accordingly.

Groups can also contain other groups as well as individual applications to create a hierarchical grouping structure. A group may also manage a set of redundant applications (or groups) together as a "failover" group. In a failover group situation, the failover group data object indicates a number of member applications that must be operational for the group to be considered operational, and a maximum number of member applications that should be operational at any given time. If more member applications are operational than the maximum number, the management server sends a message to enough of the operational applications that they should run in "backup" mode such that the number of applications not running in backup mode (or "primary") does not exceed the maximum.

The behavior for applications which receive the "backup" message is dependent on the application, but in general, these applications are not supposed to produce an output. If a primary application fails and the number of primary applications is less than the minimum for the failover group, the management server indicates to one of the backup applications that it is now a primary, at which time the application is expected to produce an output.

The repost cache mentioned above facilitates the primary/backup operation by responding to the primary and backup messages. If the application is considered a backup, the repost cache can locally cache objects but not post them when its backup application modifies them, and does not have to post objects when a repost instruction is received. Only if the application is primary need it post objects such that only one of the redundant applications is sending objects to other applications.

Subcomponents of an application can also be monitored. The client library allows an application to specify any number of components that should be monitored within the application. Each component may have a parent component, indicating the component lives within the parent in the application. For example, several threads that are to be monitored independently that live within an application can comprise components to be monitored.

Each monitored component is expected to set the status of itself against the client library and periodically call a heartbeat method on the client library. The client library aggregates the heartbeat messages together, and sends them all out in a single message when the main application's heartbeat is sent. If the main application's heartbeat has not been sent in too long of a time when a component makes its heartbeat, the client library sends the component heartbeat message directly.

The management server handles component heartbeat and status messages just as it does application heartbeat and status messages, creating corresponding data objects in the system to represent each monitored component, and pointing each component's data object to the data object representing the component's parent. In this manner, the pieces within an application can be monitored in a central manner.

Exemplary Implementations

Presented in the following discussion are several exemplary implementations of various combinations of embodiments of the components described above. The present invention is not limited to these examples, and the examples themselves are not limited to just the embodiments described.

The data query examples show how queries can be used to find data in a data store 120 when a data type indicates that objects of its type are "persisted", or saved in a data store, without an application knowing that the data was persisted. Also demonstrated is how a query language can be used to apply access control or security rules to a read.

Data Query Example 1

Application 100 desires to know all Humans in system over 30 years of age. The application issues a query: "Select h from Human h where h.Age>30" to Client Library 114. In turn the client library 114 issues the query as an instruction into the management infrastructure 15.

Management server 104 receives the instruction, locates metadata describing the data type "Human" in its internal data type definition representation. Management server 104 then identifies Human as a "Persisted" data type, indicating Human objects are stored in data store 120. The query is translated by management server 104 into data store native query language, and a query is executed query against data store 120. In response, the data store 120 returns Recordset of native data rows to Management Server 104. Management Server 104 translates, i.e., places, native data rows into Recordset of data objects, and validates each data object against Security Data Objects of Data Type 220 that exist for the client library's authenticated user. If a data object matches a filter in a Security Data Object, the management server 104 ensures that Security Data Object is set to allow reads. If not, the Data Object is not placed in the recordset. The Recordset is then sent back to the client library 114 by the management server 104, from there the Recordset is returned to the application 100.

Application 100 iterates through Recordset, reading each Human Data Object in Recordset. Alternatively, management server 104 only sends a batch of returned data objects to client library 114. As application 100 iterates through the Recordset, client library 114 returns objects from the batch to application 100, requesting the next batch of Data Objects from Client Library 114 when the current batch is empty.

As each Human Data Object is read by Client Library 114 out of a message from Management Server 104, Object Pool 406 is checked to see if a copy of the Data Object exists within the Pool. If it does, and the revision of the Data Object in the incoming message is greater than the revision in Object Pool 406, the copy in Object Pool 406 is updated to the copy in the incoming message. Otherwise, the new Data Object is placed in Object Pool 406. In either case, a reference handle to the Data Object in Object Pool 406 is returned to Application 100.

Data Query Example 2

The following example of a Data Query demonstrates how a query can be used to find data in stored among various servers when a Data Type indicates that objects of its type are not "persisted", and not stored in a single database-backed data store, without an application knowing that the data was not persisted. Portions of this example also illustrate how a management server can query multiple data stores and combine the results into a single return to a querying application. This example shows how a query against non-persisted data can utilize linked properties, and how linked properties can be used as distributed data object pointers to access data existing in other applications/data stores.

Application 100 desires to know all Instant Messages in system that were destined to a certain person. Application issues Query "Select i from InstantMessage i where i.To.Name='Joe Smith" to Client Library 114. Client Library 114 issues Query as Instruction into system. Management Server 104 receives Instruction, locates metadata describing the DataType "InstantMessage" in internal Data Type Definition representation. Management Server 104 identifies InstantMessage as a "Non-persisted" Data Type, indicating Human objects are not stored in database data store. Management Server 104 issues instruction to all Client Libraries requesting data matching Query. Various other embodiments exist, such as Client Libraries posting an indication that they provide data matching certain requirements to Management Server 104 ahead of time such that Management Server 104 can determine which Client Libraries might contain data relevant to the Query and only send those Client Libraries a query instruction.

Application 106 contains an In-Memory Cache 110, which contains Instant Message 314. Application 106 has indicated to Client Library 118 that In-Memory Cache 110 can be queried. Client Library 118 receives the Query Instruction, and searches In-Memory Cache 110 for Objects meeting the Query. As Client Library 118 checks Instant Message 314 against the Query, it attempts to traverse the "To" property to check if the person pointed to by the "To" property has a name of "Joe Smith." Object ID "OBJ001" does not exist in Client Library 118's Object Pool, so Client Library 118 issues a query to the system to located Object ID "OBJ001." As a result, using the query mechanisms being described, Human Data Object 302 is retrieved into Client Library 118's Object Pool, where it can now be referenced by Instant Message 314's "To" property. The Query is checked against Instant Message 314, and a match noted. Instant Message 314 is sent in a message to Management Server 104.

Management Server 104 receives all of the responses from Client Libraries containing caches of Instant Messages, assembles the objects into a recordset, and returns the recordset to Client Library 114 the same as in Data Query Example 1 above, using the same security rules, such that Client Library 114 and Application 100 do not see any difference in data retrieved from other servers.

Data Object Modification Example

The example below illustrates how data may be modified within the system and posted to the system. The system handles storing the data appropriately and notifying any interested subscribers that there was a data change, and whether the data changes was "into-scope," "in-scope," or "out-of-scope." This example also shows how a query language can be used to apply access control or security rules to a write.

Application 100 wishes to modify a Human Data Object it retrieved in the query in "Data Query Example". Application 100 obtains a reference handle to a copy of the Data Object in Object Pool 406, either by using a handle it was holding to the Data Object or by asking the Object Pool for a handle. Application 100 sets the appropriate fields on the Data Object. As the Data Object's fields are changed, a record of the copy of the fields before their modification is stored on the Data Object. Application 100 calls a Post method on Client Library 114 indicating the changed Data Object should be posted to the system. Client Library 114 increments the Data Object's revision number and forwards the Data Object in a message to Management Sever 104. Management Server 104 validates the Data Object against Security Data Objects of Data Type 220 that exist for Client Library 114's authenticated user. If a Data Object matches a filter in a Security Data Object, Management Server ensures that Security Data Object is set to allow writes. If not, an error condition is returned to Client Library 114.

Management Server 104 looks up the Data Type Definition for the Data Object. If the Data Type Definition indicates the Type is to be persisted, Management Server 104 saves the Data Object to Data Store 120 by mapping the Data Object into Data Store 120's native format. Client Library 114 and Management Server 104 can employ one of many well-understood consistency checks (optimistic or pessimistic consistency checking, or locks, as two examples) to ensure that two applications writing the same object do not conflict with each other and are transactionally consistent.

Management Server 104 looks through all Subscription Data Objects to see if (a) any subscriptions exist which match the current Data Object's values and (b) any subscriptions exist which match the previous Data Object's values. If the Data Object is allowed to be "read" by the Client Library to whom the Subscription Data Object belongs (as described above), then an event will be sent to the Client Library according to the following rules: If the Data Object matches a subscription for only case (a), an into-scope event is sent to the Client Library corresponding to the subscription. If the Data Object matches a subscription for only case (b), an out-of-scope event is sent to the Client Library corresponding to the subscription. If the Data Object matches a subscription for case (a) and (b), an in-scope event is sent to the Client Library corresponding to the subscription.

Data Query with Subscription Example

The following example shows how a query may be created to listen to updates to data objects posted as described above.

Application 100 executes the Query as in "Data Query— Example 1," indicating it also wishes to subscribe to updates. Management Server 104 creates a Subscription Data Object 502 indicating that it wishes to subscribe to updates on objects that match the query "Select h from Human h where h.Age>30," and Posts this Subscription Data Object to itself. As a result of the Post of the Subscription Data Object, any applications or management servers subscribed to Subscription Data Objects will receive an update indicating a new subscription exists. Any data posted to them matching the new subscription will cause an event to be forwarded to Client Library 14.

Broadcast Data Example

The following example shows how queries can be used to control data routing and transmission without application knowledge. This example adds a few steps to the subscription creation example above.

A system manager desires that all humans over 30 should be sent in a broadcast mode such that a modification to such a human will result in a single message from a Management Server to all Client Libraries instead of a message being sent to each relevant Client Library. The system manager creates Broadcast Data Object 500, indicating that all Data Objects that match the query "Select h from Human h where h.Age>30" should be sent as a broadcast message on the "Over30" broadcast channel. Application 100 attempts to create a subscription "Select h from Human h where h.Age>30 and h.Employer.Name='ACME Inc.'." Management Server 104 receives the subscription request as described above, and checks if the subscription's query overlaps with a Broadcast query. It discovers that "Select h from Human h where h.Age>30 and h.Employer.Name='ACME Inc.'" overlaps with Broadcast query "Select h from Human h where h.Age>30."

Management Server 104 indicates Client Library 104 to listen on the appropriate broadcast channel "Over30," as well as a query to be run locally to ensure that only objects received on the broadcast channel that match the subscription being created are passed from the broadcast channel to the application, "Select h from Human h where h.Age>30".

When Management Server 104 receives a Human Data Object to be Posted, Management Server 104 sees if the Data Object matches a Broadcast Query. If it discovers that the Data Object matches Broadcast Data Object 500's query (i.e. the Human Data Object's Age property is greater than 30), the post message is forwarded along on the appropriate Broadcast Channel, "Over30."

When Client Library 114 receives a post message on Broadcast Channel "Over30", it runs the local filter "Select h from Human h where h.Age>30" as well as the Security Data Object read check locally, and generates the appropriate scope event locally. This event is passed along to Application 100 as if it came from Management Server 104. The fact that the message was received in Broadcast mode and the event generation run on the local client instead of a server is transparent to Application 100.

Remote Procedure Call

The following example shows how a remote procedure call can be made through the same interface as above.

Application 102 wishes to provide a service that can be called by other Applications to many two people. It registered a procedure name "Marry" that takes two Human Data Objects as parameters with Management Sever 104, which in turn creates a Procedure Data Object to represent the Procedure and who provides it (Application 102 via Client Library 116). Application 100 wishes to execute the Marry procedure. It locates two Human Data Objects, 302 and 304 to marry, and executes a procedure string "Proc Many(OBJ001, OBJ002)" by calling the same Client Library 114 API call as was used to query data. This call is sent to Management Server 104, which locates which Application(s) is/are providing the "Many" procedure. Well-know load-balancing and failover algorithms are used to determine which specific provider will receive the call as well as ensure at least one provider executes the call.

Management Server 104 sends the procedure execution to Client Library 116, which calls code in Application 102 to execute the procedure. Unless Client Library 116 already has Data Objects 302 and 304 in its Object Pool, when Application 102 attempts to access its references to OBJ001 and OBJ002, Client Library 116 will end up loading Data Objects 302 and 304 via a query into the system as described above. Application 102 executes it's marry code, in this case, setting the Spouse property of each Data Object passed into the marry code to the other Data Object, and posting the results. Application 102 places each of the Data Objects in a recordset to be returned from the Procedure and sends a return from procedure message to Management Server 104.

Management Server 104 checks the recordset against Security Data Objects and returns the recordset in the same fashion as described in Data Query Example 1 above such that Client Library 114 is not aware that it is receiving data made through a remote procedure call.

Remote Procedure Call with Updates Example

The following example shows one of many ways to allow a remote procedure call to return results to a caller and also send updates in the future to the returned recordset and Data Objects.

Application 100 executes the "Marry" procedure as described in "Remote Procedure Call Example," but indicates that it also wishes to subscribe to updates to the returned recordset.

Application 102 executes its procedure code as described above. When constructing the Recordset, Client Library 116 posts a ProcedureCall Data Object indicating that the procedure was called with OBJ001 and OBJ002 parameters. It then creates a Subscription Query that matches data objects in the return Recordset, the specifics of which are dependent on how the Recordset was constructed. In this example, the subscription Query specifically isolates the two data objects passed in as parameters, or "Select h from Human where h.ID='OBJ001' OR h.ID='OBJ002'". This subscription is passed along to Management Server 104 to be registered on behalf of Client Library 114.

Management Server 104 creates a Subscription Data Object for Client Library 114 with the Subscription Query created by Client Library 116. When Management Server later detects that it needs to change data in the returned Recordset, it simply makes the appropriate changes to OBJ001 or OBJ002, and posts the changes Management Server 104 will note that Client Library 114 has subscribed to changes to the appropriate objects in its list of Subscription Data Objects and fire events to Client Library 114 as appropriate. As a result, Client Library 114 receives events on Objects matching the Recordset returned by a procedure it called.

Figure 7:
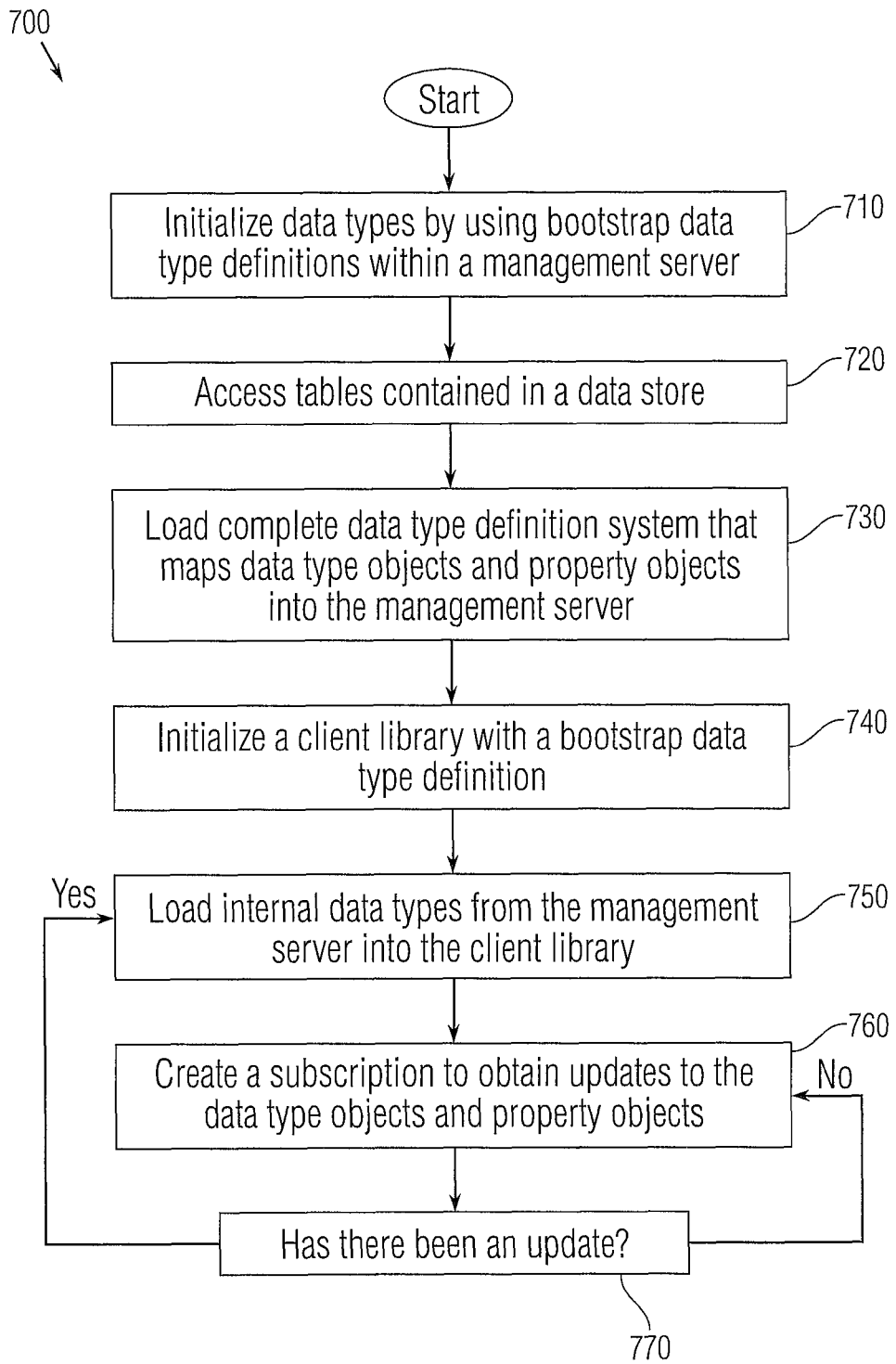
FIG. 7 is a flow diagram of a process in accordance with an aspect of the invention.

FIG. 7 is a flow diagram of a process 700 which achieves data object compatibility across a system made up of disparate applications. Process 700 initializes management server 104 by using data types and data objects that contain information about the data types and the data objects themselves. Hard coded into each management server are basic type definitions called bootstrap type definitions 203, which define the objects. At step 710, data types are initialized by using the bootstrap data type definitions 203 within the management server 104. After start up management server 104 connects to data store 120. Management server 104 starts with a bootstrap data type definition that defines data types 212 and 214. The management server is then able to access the tables in the data store, step 720. Once the table is accessed, step 730, management server 104 reads system data type definitions from data store 120 by reading tables in Data Store 120. These tables contain rows that management server 104 maps into data objects and property objects defined by bootstrap data types 212 and 214. The data type definition now exists as data objects within the management server 104. Similarly, bootstrap data type definitions 203 are coded into the client library 114. At step 740, application 100 starts up and initializes the client library 114. Internal data types are loaded into the client library, step 750, from the management server. These data type objects and property objects contain the definition information for data types 202, 204, 206, 208, and 210. A subscription is created, as described above, at step 760, to obtain updates to the data type objects and property objects. Process 700 monitors the status of the data objects specified in the subscriptions, step 770. If there has been an update, the data object is loaded into the client library.

Figure 8:
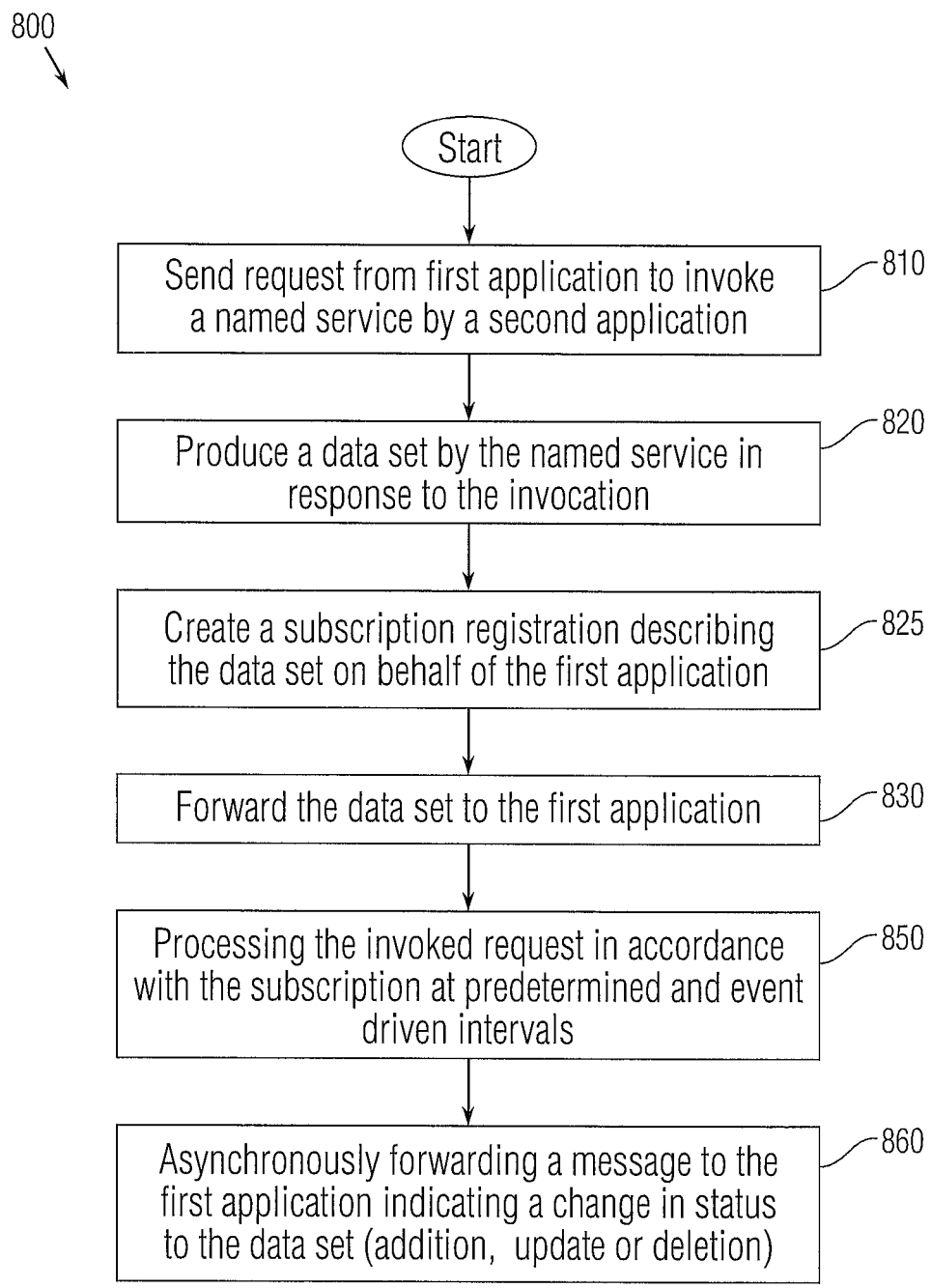
FIG. 8 is a flow diagram of another process in accordance with an aspect of the invention.

FIG. 8 is a flow chart of a process 800 which performs request/response messaging and generation of a subsequent subscription. At step 810 a first application sends a request to invoke a service (procedure) by a second application. The named service produces a data set, step 820, in response to it being invoked. At step 825, the named service then creates a subscription describing the returned data set and registers this with the system on behalf of the first application. The named service, step 830, returns the data set to the first (requesting) application. At predetermined or event-driven intervals, step 850, the second application may perform processing which changes the state of one of the objects contained in the original returned set. In response to the invoked change, the second application compares the change to the subscription's data set description, and upon noting that the changed object does or does not (but used to) match the data set, forwards a message, step 860, to the first application indicating a change in the status of the data objects within the data set. The change can be into-scope, out-of scope, or in-scope.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one described embodiment to another are also fully intended and contemplated. The invention is defined solely with regard to the claims appended hereto, and equivalents of the recitations therein.

We claim:

1. A computer-implemented system configured to manage data object sharing among applications, comprising:
   at least one computer having a processor, a memory, and being respectively configured to execute a first application and/or a second application that is a different application than the first application, wherein each of the first application and the second application has at least one respective instantiated data object having a data object type definition;

at least one set of code (SOC) to which the first application and the second application respectively register;

a first client library associated with the first application and in communication with the respective SOC, and a second client library associated with the second application and in communication with the respective SOC, each of the first client library and/or the second client library being operable to:

receive, as a function of an event subscription that does not specify an application, client library or SOC and that represents an interest by the first client library and/or the second client library to be notified of all changes to data objects, matching a given data set definition statement, by a respective client library and/or the respective SOC, an event notification comprising changes to the data object type definition respectively originating from any of one or more applications, client libraries and SOCs;

dynamically change an internal representation of the data object type definition used by the respective client library's application in response to the event notification; and manage the at least one instantiated data object in accordance with the changed data object type definition;

wherein each of the at least one respective instantiated data object of the first application and the second application is synchronized.

2. The system of claim 1, wherein the first application exchanges the portion of the at least one instantiated data object with at least the second application.

3. The system of claim 2, wherein the data object type definition is included within of the at least one instantiated data object.

4. The system of claim 1, wherein the data object type definition is included within of the at least one instantiated data object.

5. The system of claim 1, wherein at least one of the first client library and the second client library comprises a respective SOC and performs the functionality thereof.

6. The system of claim 1, wherein the data object type definition comprises at least one strongly typed definition.

7. The system of claim 1, wherein the data object type definition comprises at least one field linking to another data type.

8. The system of claim 7, wherein the data object type definition comprises at least one data type that inherits from a parent data type.

9. The system of claim 1, wherein the data object type definition comprises at least one data type that inherits from a parent data type.

10. The system of claim 1, wherein the data type definition comprises an indicator that a particular data object type is one of transient, persistent, or history-enabled.

11. The system of claim 1, wherein the data type definition comprises an indicator that a particular data field of one of the plurality of data objects is at least one of linked and coupled.

12. The system of claim 1, wherein the data object type definition is versioned.

13. The system of claim 1, wherein the data object type definition is serialized into a string or file format.

14. The system of claim 1, wherein a subset of the data objects comprise security and access control information concerning which data objects the client library can read and/or write.

15. The system of claim 1, wherein each of the first client library and the second client library is further configured to cast one or more data objects from one data type to another.

16. The system of claim 1, wherein one or more of the instantiated data objects has a field comprising a coupled second data object.

17. The system of claim 1, wherein the at least one instantiated data object has an object hook executable by at least one of the first client library and the second client library in response to a specified action.

18. The system of claim 1, wherein the at least one instantiated data object has a local property setter or getter.

19. The system of claim 1, wherein at least one of the first client library and the second client library is further configured to pass the at least one instantiated data object as a value or reference type.

20. The system of claim 1, wherein the internal representation of the data object type definition is further dynamically changed by:

receiving a data object representing a data object type definition; and updating a representation of a bootstrap data type definition or updating a representation of a non-bootstrap data type definition, in accordance with the data object representing the data object type definition.

21. The system of claim 1, wherein the internal representation of the data object type is further dynamically changed by updating a representation of a bootstrap data type definition or updating a representation of a non-bootstrap data type definition in response to the event notification.

22. The system of claim 1, wherein the first application and the second application register to a first SOC.

23. The system of claim 1, wherein the first application registers to a first SOC and the second application registers to a second SOC.

24. The system of claim 1, wherein the first client library and the second client library are the same library.

25. The system of claim 1, wherein the first client library and the second client library are different libraries.

26. The system of claim 1wherein the event subscription automatically occurs on behalf of the respective client library by the respective SOC.

27. The system of claim 1, wherein the data set definition statement is sent in a broadcast mode.

28. A computer-implemented method for managing data-object sharing among at least a first application and a second application, each application executing in at least one respective computer having a processor and a memory;

associating a first client library with the first application;

associating a second client library with the second application, wherein the second application is a different application than the first application, and further wherein each of the first application and the second application has at least one respective instantiated data object having a data object type definition;

executing at least one set of code (SOC) to which the first application and the second application respectively register;

dynamically changing an internal representation of the data type definition used by the first or the second application, respectively, in response to an event notification received, as a function of an event subscription that does not specify an application, client library or SOC and that represents an interest by the first client library and/or the second client library to be notified of all changes to data objects matching a given data set definition statement, by the respective client library and/or the respective SOC, the event notification identifying changes to the data object type definition respectively originating from any of one or more applications, client libraries and SOCs; and managing a plurality of data objects defined in accordance with the changed data object type definition.

29. The method of claim 28, further comprising receiving a data object that itself comprises the data object type definition.

30. The method of claim 28, wherein dynamically changing the internal representation further comprises:
receiving a data object representing a data object type definition; and updating a representation of a bootstrap data object type definition or updating a representation of a non-bootstrap data object type definition, in accordance with the data object representing the data object type definition.

31. The method of claim 28, wherein dynamically changing the internal representation further comprises updating a representation of a bootstrap data type definition or updating a representation of a non-bootstrap data type definition in response to the event notification.

32. The method of claim 28, wherein the first application and the second application register to a first SOC.

33. The method of claim 28, wherein the first application registers to a first SOC and the second application registers to a second SOC.

34. The method of claim 28, wherein the first client library and the second client library are the same library.

35. The method of claim 28, wherein the first client library and the second client library are different libraries.

36. The method of claim 28, further comprising sending the data set definition statement in a broadcast mode.

* * * * *